(12) United States Patent
Chen

(10) Patent No.: US 9,553,700 B2
(45) Date of Patent: Jan. 24, 2017

(54) COMMUNICATION METHOD FOR CONTROL CHANNEL AND APPARATUS

(71) Applicant: HUAWEI TECHNOLOGIES CO., LTD., Shenzhen, Guangdong (CN)

(72) Inventor: Xiaofeng Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 195 days.

(21) Appl. No.: 14/065,739

(22) Filed: Oct. 29, 2013

(65) Prior Publication Data

US 2014/0056280 A1 Feb. 27, 2014

Related U.S. Application Data

(63) Continuation of application No. PCT/CN2012/074888, filed on Apr. 28, 2012.

(30) Foreign Application Priority Data

Apr. 29, 2011 (CN) .......................... 2011 1 0110640

(51) Int. Cl.
 H04L 5/00 (2006.01)
 H04B 7/06 (2006.01)
 H04L 27/26 (2006.01)

(52) U.S. Cl.
 CPC ............. *H04L 5/0005* (2013.01); *H04B 7/068* (2013.01); *H04B 7/0671* (2013.01);
 (Continued)

(58) Field of Classification Search
 CPC ..... H04B 7/0634; H04B 7/068; H04B 7/0671; H04B 7/04; H04B 7/0404; H04B 7/0408; H04B 7/0413
 See application file for complete search history.

(56) References Cited

U.S. PATENT DOCUMENTS 7,609,789 B2 * 10/2009 Leshem ........................ 375/346
8,385,441 B2 * 2/2013 Perets et al. .................. 375/260
(Continued)

FOREIGN PATENT DOCUMENTS

CN 101179314 A 5/2008
CN 101541070 A 9/2009
(Continued)

OTHER PUBLICATIONS

International Search Report, dated Jun. 28, 2012, in corresponding International Application No. PCT/CN2012/074888 (4 pp.).
(Continued)

*Primary Examiner* — Anh-Vu Ly
*Assistant Examiner* — Hector Reyes Ortiz
(74) *Attorney, Agent, or Firm* — Staas & Halsey LLP

(57) ABSTRACT

A control channel of a communication method and an apparatus includes at least one timeslot, and the method includes: obtaining, according to a first data symbol sequence to be transmitted in a timeslot and coefficients a(i) and d(i), a second data symbol sequence and a third data symbol sequence, where, in a(i)+d(i), at least one pair of a(u)+d(u) and a(v)+d(v) have moduli unequal to each other; and using the same extension sequence [w(0), w(1), . . . , w(N−1)] to process the second data symbol sequence and the third data symbol sequence, mapping the processed data respectively onto the same time-frequency resources corresponding to a first antenna array and a second antenna array, and transmitting the data, where i, u, and v are integers, $0 \le i \le M-1$, and $u \ne v$.

15 Claims, 12 Drawing Sheets

---

Obtain, according to a first data symbol sequence to be transmitted in a timeslot and coefficients a(i) and d(i), a second data symbol sequence and a third data symbol sequence, where, in a(i)+d(i), at least one pair of a(u)+d(u) and a(v)+d(v) have unequal moduli ~101

Use the same extension sequence to process the second data symbol sequence and the third data symbol sequence, map the processed data respectively onto the same time-frequency resources corresponding to a first antenna array and a second antenna array, and transmit the data ~102

(52) U.S. Cl.
CPC .......... *H04L 5/0016* (2013.01); *H04L 5/0023* (2013.01); *H04L 5/0048* (2013.01); *H04L 5/0053* (2013.01); *H04L 27/2636* (2013.01)

(56) References Cited

U.S. PATENT DOCUMENTS

2006/0251198 A1* 11/2006 Ma et al. ...................... 375/350
2010/0034305 A1* 2/2010 Popovic ....................... 375/260
2010/0238984 A1* 9/2010 Sayana et al. ................ 375/219

FOREIGN PATENT DOCUMENTS

CN      101729210 A    6/2010
EP      1585232    10/2005

OTHER PUBLICATIONS

*RAN1 Chairman's Notes.* 3GPP TSG RAN WG1 Meeting #62, Madrid, Spain, Aug. 23-27, 2010.
International Search Report issued Jun. 28, 2012, in corresponding International Patent Application No. PCT/CN2012/074888.
Extended European Search Report issued on May 21, 2014 in corresponding European Patent Application No. 12 777 423.0.
Office Action, dated Jul. 28, 2015, in corresponding Chinese Application No. 201280021067.2 (11 pp.).

* cited by examiner

COMMUNICATION METHOD FOR CONTROL CHANNEL AND APPARATUS

CROSS-REFERENCE TO RELATED APPLICATIONS

This application is a continuation of International Application No. PCT/CN2012/074888, filed on Apr. 28, 2012, which claims priority to Chinese Patent Application No. 201110110640.4, filed on Apr. 29, 2011, both of which are hereby incorporated by reference in their entireties.

TECHNICAL FIELD

Embodiments of the present invention relate to communication technologies, and in particular, to a communication method for a control channel and an apparatus.

BACKGROUND

In a long term evolution advanced (Long Term Evolution Advanced, LTE-A for short) system, uplink physical channels include: physical uplink shared channel (Physical Uplink Shared Channel, PUSCH for short) and physical uplink control channel (Physical Uplink Control Channel, PUCCH for short). In general, uplink control signaling is transmitted over a PUCCH, and types of uplink control signaling mainly include: channel quality indicator (Channel Quality Indicator, CQI for short) signaling, acknowledgement/non-acknowledgement (Acknowledged/non-acknowledged, ACK/NACK for short) message, and scheduling request indication message.

In an LTE/LTE-A system, when uplink control signaling is transmitted over a PUCCH, different types of control signaling are transmitted in different formats (or carriers), such as PUCCH format 1/1a/1b, format (format) 2/2a/2b, and format (format) 3. Each PUCCH format is formed by two timeslots. Each timeslot (slot) occupies a physical resource block (Physical Resource Block, PRB for short) defined by LTE/LTE-A. From the time perspective, a PRB includes seven or six single-carrier frequency division multiple access (Single Carrier-Frequency Division Multiple Access, SC-FDMA for short) symbols; from the frequency perspective, a PRB occupies 12 consecutive subcarriers defined by LTE/LTE-A. A specific PUCCH format is intended for transmitting certain uplink control signaling, and, for simplicity, a PUCCH format is herein called a PUCCH. One PRB can accommodate multiple PUCCHs of the same PUCCH format, and different PUCCHs are distinguished by different sequences. Generally, different PUCCH formats are not distinguishable from each other within one PRB.

It is assumed that one PRB can accommodate up to D PUCCHs of a specific format, which are distinguished from each other by D different sequences. In the prior art, if a transmitting terminal has only one transmitting antenna and each terminal needs to transmit a different PUCCH, one PRB can support up to D transmitting terminals to transmit uplink control signaling simultaneously. In the prior art, if a transmitting terminal has two transmitting antennas, where each antenna of each terminal needs to transmit a different PUCCH, that is, each transmitting terminal requires two PUCCHs, one PRB can support up to D/2 transmitting terminals. With the increase of antennas, the number of transmitting terminals supported by one PRB is decreased. Therefore, the transmitting terminals borne in one PRB are limited, which leads to a low rate of resource utilization.

SUMMARY

Embodiments of the present invention provide a communication method for a control channel and an apparatus to improve resource utilization effectively.

An embodiment of the present invention provides a communication method for a control channel, where the control channel includes at least one timeslot, and the method includes:

obtaining, according to a first data symbol sequence [q(0), q(1), . . . , q(M−1)] to be transmitted in a timeslot and coefficients a(i) and d(i), a second data symbol sequence [a(0)q(0), a(1)q(1), . . . , a(M−1)q(M−1)] and a third data symbol sequence [d(0)q(0), d(1)q(1), . . . , d(M−1)q(M−1)], where, in a(i)+d(i), at least one pair of a(u)+d(u) and a(v)+d(v) have unequal moduli; and using the same extension sequence [w(0), w(1), . . . , w(N−1)] to process the second data symbol sequence and the third data symbol sequence, mapping the processed data respectively onto the same time-frequency resources corresponding to a first antenna array and a second antenna array, and transmitting the data, where, i, u, and v are integers, 0≤i≤M−1, 0≤u≤M−1, 0≤v≤M−1, and u≠v.

An embodiment of the present invention provides a transmitting terminal, including:

a data symbol obtaining module, configured to obtain, according to a first data symbol sequence [q(0), q(1), . . . , q(M−1)] to be transmitted in a timeslot and coefficients a(i) and d(i), a second data symbol sequence [a(0)q(0), a(1)q(1), . . . , a(M−1)q(M−1)] and a third data symbol sequence [d(0)q(0), d(1)q(1), . . . , d(M−1)q(M−1)], where, in a(i)+d(i), at least one pair of a(u)+d(u) and a(v)+d(v) have unequal moduli; and a data symbol processing module, configured to use the same extension sequence to process the second data symbol sequence and the third data symbol sequence, map the processed data respectively onto the same time-frequency resources corresponding to a first antenna array and a second antenna array, and transmit the data, where, i, u, and v are integers, 0≤i≤M−1, 0≤u≤M−1, 0≤v≤M−1, and u≠v.

Further, an embodiment of the present invention provides a communication method for a control channel, where the control channel includes at least one timeslot, and the method includes:

receiving first data transmitted by a transmitting terminal, where the first data is obtained after the transmitting terminal uses the same extension sequence [w(0), w(1), . . . , w(N−1)] to process a second data symbol sequence [a(0)q(0), a(1)q(1), . . . , a(M−1)q(M−1)] and a third data symbol sequence [d(0)q(0), d(1)q(1), . . . , d(M−1)q(M−1)] that are obtained according to a first data symbol sequence [q(0), q(1), . . . , q(M−1)] to be transmitted in a timeslot and coefficients a(i) and d(i), and then mapped respectively onto the same time-frequency resources corresponding to a first antenna array and a second antenna array and transmitted; and obtaining, according to the first data, the extension sequence [w(0), w(1), . . . , w(N−1)], and the coefficients a(i) and d(i), a data symbol q(i) to be transmitted by the transmitting terminal, where, in a(i)+d(i), at least one pair of a(u)+d(u) and a(v)+d(v) have unequal moduli; i, u, and v are integers, 0≤i≤M−1, 0≤u≤M−1, 0≤v≤M−1, and u≠v.

An embodiment of the present invention provides a receiving terminal, including:

a receiving module, configured to receive first data transmitted by a transmitting terminal, where the first data is obtained after the transmitting terminal uses the same extension sequence [w(0), w(1), . . . , w(N−1)] to process a second data symbol sequence [a(0)q(0), a(1)q(1), . . . , a(M−1)q(M−1)] and a third data symbol sequence [d(0)q(0), d(1)q(1), . . . , d(M−1)q(M−1)] that are obtained according to a first data symbol sequence [q(0), q(1), . . . , q(M−1)] to be transmitted in a timeslot and coefficients a(i) and d(i), and then mapped respectively onto the same time-frequency resources corresponding to a first antenna array and a second antenna array and transmitted; and an obtaining module, configured to obtain, according to the first data, the extension sequence [w(0), w(1), . . . , w(N−1)], and the coefficients a(i) and d(i), a data symbol q(i) to be transmitted by the transmitting terminal, where, in a(i)+d(i), in pair of a(u)+d(u) and a(v)+d(v) have unequal moduli; i, u, and v are integers, 0≤i≤M−1, 0≤u≤M−1, 0v≤M−1, and u≠v.

By using the communication method for a control channel and the apparatuses in the embodiments of the present invention, a second data symbol sequence and a third data symbol sequence are obtained according to a first data symbol sequence to be transmitted in a timeslot and coefficients a(i) and a(i), the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, and each antenna array can use the same extension sequence. Therefore, the same PRB can bear more transmitting terminals, and resource utilization is improved effectively.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
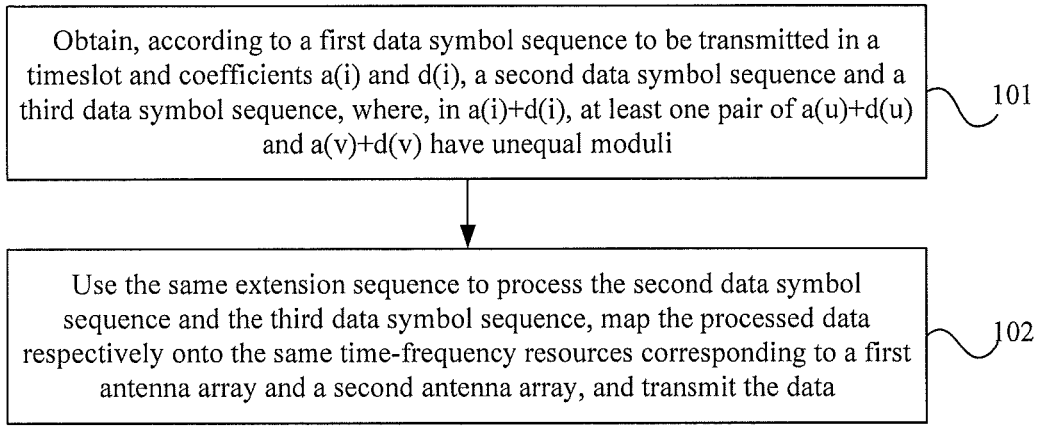
FIG. 1 is a flowchart of a communication method for a control channel according to an embodiment of the present invention.

FIG. 1 is a flowchart of a communication method for a control channel according to an embodiment of the present invention. As shown in FIG. 1, the control channel includes at least one timeslot, and the method in this embodiment includes the following:

Step 101: Obtain, according to a first data symbol sequence [q(0), q(1), . . . , q(M−1)] to be transmitted in a timeslot and coefficients a(i) and d(i), a second data symbol sequence [a(0)q(0), a(1)q(1), . . . , a(M−1)q(M−1)] and a third data symbol sequence [d(0)q(0), d(1)q(1), . . . , d(M−1)q(M−1)], where, in a(i)+d(i), at least one pair of a(u)+d(u) and a(v)+d(v) have unequal moduli;

Step 102: Use the same extension sequence [w(0), w(1), . . . , w(N−1)] to process the second data symbol sequence and the third data symbol sequence, map the processed data respectively onto the same time-frequency resources corresponding to a first antenna array and a second antenna array, and transmit the data;

where, i, u, and v are integers, $0 \leq i \leq M-1$, $0 \leq u \leq M-1$, $0 \leq v \leq M-1$, and $u \neq v$.

In this embodiment, the first antenna array and the second antenna array are arranged on the same transmitting terminal, and the first antenna array and the second antenna array each may include at least one antenna. The transmitting terminal may be a user equipment such as a mobile phone. The format of the control channel may be PUCCH format 2 (format 2) and/or PUCCH format 3 (format 3) in an LTE and/or LTE-A system. It should be noted that the number of antennas in the first antenna array and the number of antennas in the second antenna array may be equal or may not be equal. In addition, the same time-frequency resources may include the same PRB, and the same SC-FDMA symbols and/or subcarriers on the PRB.

In this embodiment, a second data symbol sequence and a third data symbol sequence are obtained according to a first data symbol sequence to be transmitted in a timeslot and coefficients a(i) and d(i), the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, and each antenna array can use the same extension sequence. Therefore, the same PRB can bear more transmitting terminals, and resource utilization is improved effectively.

Figure 2:
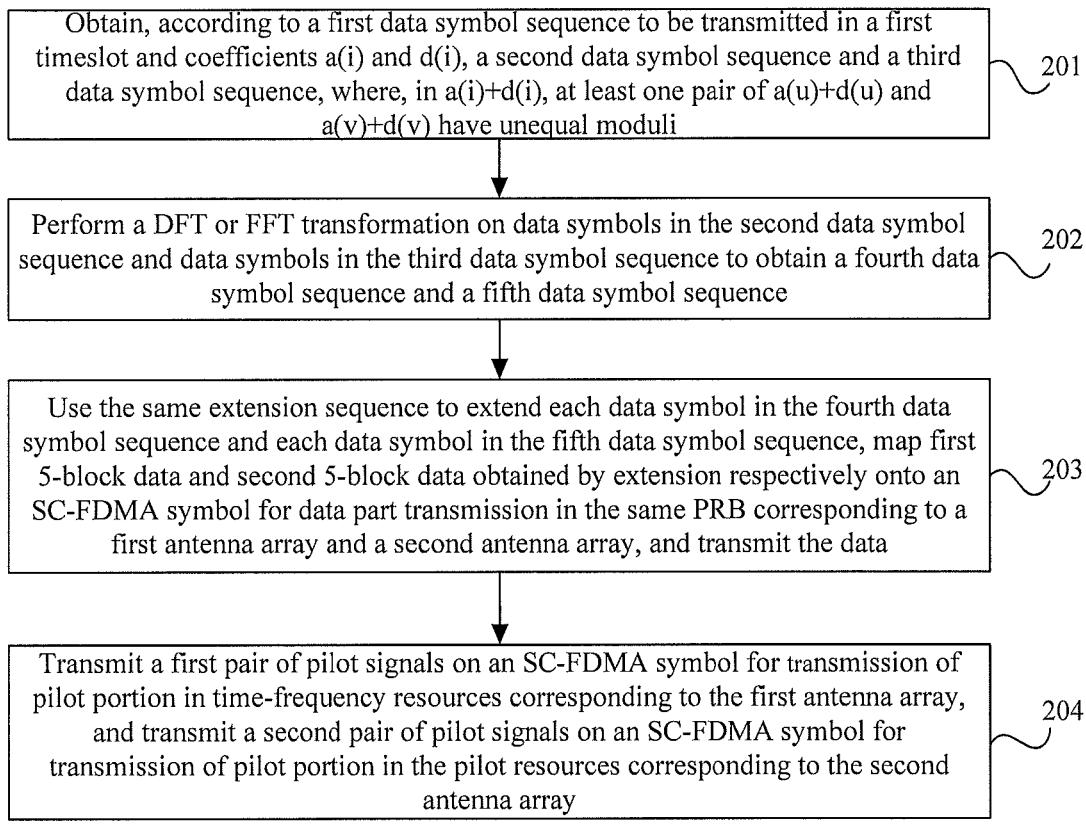
FIG. 2 is a flowchart of a communication method for a control channel according to another embodiment of the present invention.

FIG. 2 is a flowchart of a communication method for a control channel according to another embodiment of the present invention. In this embodiment, PUCCH format 3 (format 3) is taken as an example. Specifically, in an LTE-A system, an ACK/NACK message is transmitted over a PUCCH using PUCCH format 3. On a PRB occupied by the format in a timeslot (slot), there are 7 or 6 SC-FDMA symbols, of which 2 SC-FDMA symbols are used for transmission of pilot portion and the remaining 5 or 4 symbols are used for data symbol transmission. From a frequency perspective, the format occupies 12 subcarriers of one PRB defined in LTE/LTE-A, where each subcarrier indirectly corresponds to one quaternary phase shift keying (Quaternary Phase Shift Keying, QPSK for short) modulation symbol, each QPSK modulation symbol carries 2 bits, and therefore, one timeslot needs to carry 12*2=24 bits in total. Therefore, the entire DFT-S-OFDM format needs to carry a total of 24 QPSK modulation symbols, that is, 48 bits, in two timeslots.

More specifically, the antennas of the transmitting terminal are grouped into two arrays to obtain a first antenna array and a second antenna array. Each antenna array includes at least one antenna. Information bits received by the user equipment undergo channel coding (Channel coding), scrambling (scrambling), and QPSK modulation to obtain [q(0), q(1), . . . , q(23)], where [q(0), q(1), . . . , q(11)] may be transmitted in a first timeslot over the control channel, and [q(12), q(13), . . . , q(23)] may be transmitted in a second timeslot over the control channel. This embodiment describes the technical solution of the present invention in detail by assuming that [q(0), q(1), . . . , q(11)] is transmitted in the first timeslot. As shown in FIG. 2, the method in this embodiment includes the following:

Step 201: Obtain, according to a first data symbol sequence [q(0), q(1), . . . , q(11)] to be transmitted in a first timeslot and coefficients a(i) and d(i), a second data symbol sequence [a(0)q(0), a(1)q(1), . . . , a(11)q(11)] and a third data symbol sequence [d(0)q(0), d(1)q(1), . . . , d(11)q(11)], where, in a(i)+d(i), at least one pair of a(u)+d(u) and a(v)+d(v) have unequal moduli.

Step 202: Perform a discrete Fourier transformation (Discrete Fourier Transform, DFT for short) or fast Fourier transformation (Fast Fourier Transformation, FFT for short) on the data symbol a(i)q(i) in the second data symbol sequence and the data symbol d(i)q(i) in the third data symbol sequence, to obtain a fourth data symbol sequence $[Q_1(0), Q_1(1), \ldots, Q_1(1)]$ and a fifth data symbol sequence $[Q_2(0), Q_2(1), \ldots, Q_2(11)]$.

Step 203: Use the same extension sequence [w(0), w(1), . . . , w(4)] to extend each data symbol $Q_1(i)$ in the fourth data symbol sequence and each data symbol $Q_2(i)$ in the fifth data symbol sequence, map first 5-block data $[Q_1(0)w(m), Q_1(1)w(m), \ldots, Q_1(11)w(m)]$ and second 5-block data $[Q_2(0)w(m), Q_2(1)w(m), \ldots, Q_2(11)w(m)]$ obtained by extension respectively onto the $(m+1)^{th}$ SC-FDMA symbol for data part transmission in the same PRB corresponding to a first antenna array and a second antenna array, and transmit the data, where, m is an integer, and m=0, 1, . . . , 4.

Step 204: Transmit a first pair of pilot signals on an SC-FDMA symbol for transmission of pilot portion in the time-frequency resources corresponding to the first antenna array, and transmit a second pair of pilot signals on an SC-FDMA symbol for transmission of pilot portion in the pilot resources corresponding to the second antenna array.

Figure 3:
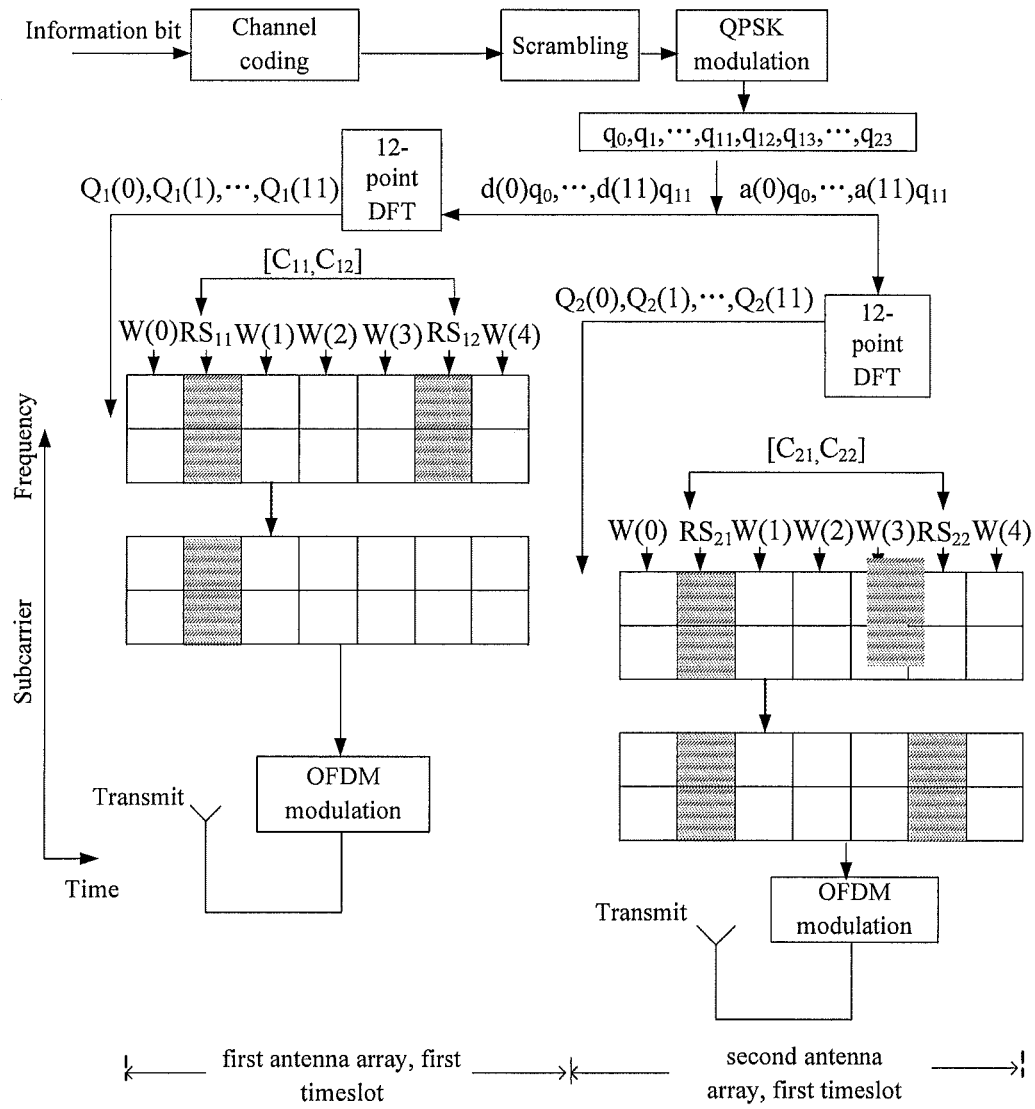
FIG. 3 is a schematic principle diagram of a communication method for a control channel according to an embodiment of the present invention.

Specifically, FIG. 3 is a schematic principle diagram of a communication method for a control channel according to an embodiment of the present invention. As shown in FIG. 3, the data symbol a(i)q(i) in the second data symbol sequence undergoes DFT or FFT transformation to obtain a fourth data symbol sequence $[Q_1(0), Q_1(1), \ldots, Q_1(11)]$, and each $Q_1(i)$ in the fourth data symbol sequence $[Q_1(0), Q_1(1), \ldots, Q_1(11)]$ is extended by using an extension sequence [w(0), w(1), . . . , w(4)] to obtain the first 5-block data $[Q_1(0)w(m), Q_1(1)w(m), \ldots, Q_1(11)w(m)]$, where m=0, 1, . . . , 4. Subsequently, $[Q_1(0)w(0), Q_1(1)w(0), \ldots, Q_1(11)w(0)]$ is mapped onto the first SC-FDMA symbol for data part transmission in the PRB corresponding to the first antenna array, $[Q_1(0)w(1), Q_1(1)w(1), \ldots, Q_1(11)w(1)]$ is mapped onto the second SC-FDMA symbol for data part transmission in the PRB, and so on, until $[Q_1(0)w(4), Q_1(1)w(4), \ldots, Q_1(11)w(4)]$ is mapped onto the fifth SC-FDMA symbol for data part transmission in the PRB corresponding to the first antenna array. It should be noted in this embodiment, before $[Q_1(0)w(m), Q_1(1)w(m), \ldots, Q_1(11)w(m)]$ is mapped onto the $(m+1)^{th}$ SC-FDMA symbol for data part transmission in the PRB corresponding to the first antenna array, cyclic shift may first be performed on $[Q_1(0)w(m), Q_1(1)w(m), \ldots, Q_1(11)w(m)]$. Subsequently, the data block obtained by the cyclic shift is mapped onto the $(m+1)^{th}$ SC-FDMA symbol for data part transmission in the PRB corresponding to the first antenna array. For example, a specific form of mapping $[Q_1(0)w(m), Q_1(1)w(m), \ldots, Q_1(11)w(m)]$ onto the $(m+1)^{th}$ SC-FDMA symbol for data part transmission in the PRB corresponding to the first antenna array is shown in Table 1:

TABLE 1

| First SC-FDMA symbol | Pilot 1 | Second SC-FDMA symbol | Third SC-FDMA symbol | Fourth SC-FDMA symbol | Pilot 2 | Fifth SC-FDMA symbol |
|---|---|---|---|---|---|---|
| $Q_1(i_1)$ *w(0) | $C_{11}$ *$RS_{11}(0)$ | $Q_1(i_2)$ *w(1) | $Q_1(i_3)$ *w(2) | $Q_1(i_4)$ *w(3) | $C_{12}$ *$RS_{12}(0)$ | $Q_1(i_5)$ *w(4) |
| $Q_1(i_1 + 1)$ *w(0) | $C_{11}$ *$RS_{11}(1)$ | $Q_1(i_2 + 1)$ *w(1) | $Q_1(i_3 + 1)$ *w(2) | $Q_1(i_4 + 1)$ *w(3) | $C_{12}$ *$RS_{12}(1)$ | $Q_1(i_5 + 1)$ *w(4) |
| $Q_1(i_1 + 2)$ *w(0) | $C_{11}$ *$RS_{11}(2)$ | $Q_1(i_2 + 2)$ *w(1) | $Q_1(i_3 + 2)$ *w(2) | . . . | $C_{12}$ *$RS_{12}(2)$ | . . . |
| . . . | . . . | . . . | . . . | $Q_1(11)$ *w(3) | . . . | . . . |
| . . . | . . . | $Q_1(11)$ *w(1) | . . . | $Q_1(0)$ *w(3) | . . . | . . . |
| . . . | . . . | $Q_1(0)$ *w(1) | $Q_1(11)$ *w(2) | $Q_1(1)$ *w(3) | . . . | . . . |
| . . . | . . . | $Q_1(1)$ *w(1) | $Q_1(0)$ *w(2) | . . . | . . . | $Q_1(11)$ *w(4) |
| $Q_1(11)$ *w(0) | . . . | . . . | $Q_1(1)$ *w(2) | . . . | . . . | $Q_1(0)$ *w(4) |
| $Q_1(0)$ *w(0) | . . . | . . . | . . . | . . . | . . . | $Q_1(1)$ *w(4) |
| $Q_1(1)$ *w(0) | . . . | . . . | . . . | . . . | . . . | . . . |
| . . . | $C_{11}$ *$RS_{11}(10)$ | . . . | . . . | . . . | $C_{12}$ *$RS_{12}(10)$ | . . . |
| $Q_1(i_1 - 1)$ *w(0) | $C_{11}$ *$RS_{11}(11)$ | $Q_1(i_2 - 1)$ *w(1) | $Q_1(i_3 - 1)$ *w(2) | $Q_1(i_4 - 1)$ *w(3) | $C_{12}$ *$RS_{12}(11)$ | $Q_1(i_5 - 1)$ *w(4) |

DFT or FFT transformation is performed on the data symbol d(i)q(i) in the third data symbol sequence to obtain a fifth data symbol sequence $[Q_2(0), Q_2(1), \ldots, Q_2(11)]$, and each $Q_2(i)$ in the fifth data symbol sequence $[Q_2(0), Q_2(1), \ldots, Q_2(11)]$ is extended by using the same extension sequence $[w(0), w(1), \ldots, w(4)]$ to obtain the second 5-block data $[Q_2(0)w(m), Q_2(1)w(m), \ldots, Q_2(11)w(m)]$, where m=0, 1, . . . , 4. Subsequently, the second 5-block data is mapped onto the first SC-FDMA symbol for data part transmission in the PRB corresponding to the second antenna array, $[Q_2(0)w(1), Q_2(1)w(1), \ldots, Q_1(11)w(1)]$ is mapped onto the second SC-FDMA symbol for data part transmission in the PRB corresponding to the second antenna array, and so on, until $[Q_2(0)w(4), Q_2(1)w(4), \ldots, Q_2(11)w(4)]$ is mapped onto the fifth SC-FDMA symbol for data part transmission in the PRB corresponding to the second antenna array. It should be noted in this embodiment, before $[Q_1(0)w(m), Q_1(1)w(m), \ldots, Q_1(11)w(m)]$ is mapped onto the $(m+1)^{th}$ SC-FDMA symbol for data part transmission in the PRB corresponding to the second antenna array, cyclic shift may first be performed on $[Q_2(0)w(m), Q_2(1)w(m), \ldots, Q_2(11) w(m)]$. Subsequently, the data block obtained by the cyclic shift is mapped onto the $(m+1)^{th}$ SC-FDMA symbol for data part transmission in the PRB corresponding to the second antenna array. For example, a specific form of mapping $[Q_2(0)w(m), Q_2(1)w(m), \ldots, Q_2(11)w(m)]$ onto the $(m+1)^{th}$ SC-FDMA symbol for data part transmission in the PRB corresponding to the second antenna array is shown in Table 2:

TABLE 2

| First SC-FDMA symbol | Pilot 1 | Second SC-FDMA symbol | Third SC-FDMA symbol | Fourth SC-FDMA symbol | Pilot 2 | Fifth SC-FDMA symbol |
|---|---|---|---|---|---|---|
| $Q_2(i_1)$ *w(0) | $C_{21}$ *$RS_{21}(0)$ | $Q_2(i_2)$ *w(1) | $Q_2(i_3)$ *w(2) | $Q_2(i_4)$ *w(3) | $C_{22}$ *$RS_{22}(0)$ | $Q_2(i_5)$ *w(4) |
| $Q_2(i_1 + 1)$ *w(0) | $C_{21}$ *$RS_{21}(1)$ | $Q_2(i_2 + 1)$ *w(1) | $Q_2(i_3 + 1)$ *w(2) | $Q_2(i_4 + 1)$ *w(3) | $C_{22}$ *$RS_{22}(1)$ | $Q_2(i_5 + 1)$ *w(4) |
| $Q_2(i_1 + 2)$ *w(0) | $C_{21}$ *$RS_{21}(2)$ | $Q_2(i_2 + 2)$ *w(1) | $Q_2(i_3 + 2)$ *w(2) | . . . | $C_{22}$ *$RS_{22}(2)$ | . . . |
| . . . | . . . | . . . | . . . | $Q_2(11)$ *w(3) | . . . | . . . |
| . . . | . . . | $Q_2(11)$ w(1) | . . . | $Q_2(0)$ *w(3) | . . . | . . . |
| . . . | . . . | $Q_2(0)$ w(1) | $Q_2(11)$ w(2) | $Q_2(1)$ *w(3) | . . . | . . . |
| . . . | . . . | $Q_2(1)$ w(1) | $Q_2(0)$ w(2) | . . . | . . . | $Q_2(11)$ *w(4) |
| $Q_2(11)$ *w(0) | . . . | . . . | $Q_2(1)$ w(2) | . . . | . . . | $Q_2(0)$ *w(4) |
| $Q_2(0)$ *w(0) | . . . | . . . | . . . | . . . | . . . | $Q_2(1)$ *w(4) |
| $Q_2(1)$ *w(0) | . . . | . . . | . . . | . . . | . . . | . . . |
| . . . | $C_{21}$ *$RS_{21}(10)$ | . . . | . . . | . . . | $C_{22}$ *$RS_{22}(10)$ | . . . |

TABLE 2-continued

| First SC-FDMA symbol | Pilot 1 | Second SC-FDMA symbol | Third SC-FDMA symbol | Fourth SC-FDMA symbol | Pilot 2 | Fifth SC-FDMA symbol |
|---|---|---|---|---|---|---|
| $Q_2(i_1-1)$ *w(0) | $C_{21}$ *$RS_{21}$(11) | $Q_2(i_2-1)$ *w(1) | $Q_2(i_3-1)$ *w(2) | $Q_2(i_4-1)$ *w(3) | $C_{22}$ *$RS_{22}$(11) | $Q_2(i_5-1)$ *w(4) |

More specifically, coefficient a(i)=1, and coefficient $$d(i) = \begin{cases} 1 & i = 2n \\ -1 & i = 2n+1 \end{cases};$$

or
Coefficient a(i)=1, and coefficient $$d(i) = \exp\left(\frac{j2\pi * \gamma_1 * i}{M}\right);$$

or
Coefficient a(i)=1, and coefficient $$d(i) = \begin{cases} 1 & i = 4n \\ -1 & i = 4n+1 \\ j & i = 4n+2 \\ -j & i = 4n+3 \end{cases};$$

or
Coefficient $$d(i) = \exp\left(\frac{j2\pi * \gamma_1 * i}{M}\right),$$

and coefficient $$d(i) = \exp\left(\frac{j2\pi * \gamma_2 * i}{M}\right),$$

where, n, $\gamma_1$, and $\gamma_2$ are integers, $0 \leq 2n \leq M-1$, $0 \leq 2n+1 \leq M-1$, $0 \leq 4n \leq M-1$, $0 \leq 4n+1 \leq M-1$, $0 \leq 4n+2 \leq M-1$, $0 \leq 4n+3 \leq M-1$, and $\gamma_1 \neq \gamma_2$.

Evidently, for the data part, the first antenna array is consistent with the second antenna array except that a(i)q(i) needs to be replaced with d(i)q(i) in all relevant steps.

In addition, as shown in Table 1, two SC-FDMA symbols (pilot 1 and pilot 2) for transmission of pilot portion exist in the PRB. Each pilot SC-FDMA symbol transmits a 12-bit sequence. A sequence actually used by each pilot SC-FDMA symbol is derived from a 12-bit root sequence by performing cyclic shift (Cyclic Shift). For example, for the root sequence [z(0), z(1), . . . , z(11)], a sequence obtained by performing cyclic shift thereon is [z(i), z(i+1), . . . z(11), z(0), . . . , z(i-1)]. In theory, all sequences derived from the root sequence by performing cyclic shift are basically orthogonal. However, in practical applications, due to the multiple paths of a radio channel, two adjacent cyclically-shifted sequences such as [z(i), z(i+1), . . . z(11), z(0), . . . , z(i-1)] and [z(i+1), z(i+2), . . . z(11), z(0), . . . , z(i-1)] may be poorly orthogonal on a receiver side. Therefore, cyclically-shifted sequences are generally fetched at intervals, for example, at intervals of 2 or 3. Being at intervals of 2, only 6 sequences among 12 cyclically-shifted sequences are usable in a practical application. In this embodiment, cyclic shift may be performed on a 12-bit root sequence to obtain a cyclically-shifted sequence $RS_1(i)$, where i=0, 1, . . . , 11. The cyclically-shifted sequence is multiplied by coefficients $C_{11}$ and $C_{12}$ respectively to obtain a first pair of pilot signals ($C_{11}RS_1(i)$ and $C_{12}RS_1(i)$), and on the basis, in order to randomize interference, $C_{11}RS_1(i)$ and $C_{12}RS_1(i)$ in the first pair of pilot signals may undergo further cyclic shift to obtain sequences $C_{11}RS_{11}(i)$ and $C_{12}RS_{12}(i)$, respectively, and the obtained sequences are mapped onto two corresponding pilot SC-FDMA symbols. Finally, after other possible processing such as inter-cell interference coordination and interference randomization, five SC-FDMA symbols for data part transmission and two SC-FDMA symbols for transmission of pilot portion in the first timeslot undergo OFDM modulation, and are then transmitted from the first antenna array.

As shown in Table 2, two SC-FDMA symbols (pilot 1 and pilot 2) for transmission of pilot portion exist in the PRB. Similar to the processing of the first antenna array, in this embodiment, cyclic shift may be performed on a 12-bit pilot sequence to obtain a cyclically-shifted sequence $RS_2(i)$, where i=0, 1, . . . , 11. The cyclically-shifted sequence is multiplied by coefficients $C_{21}$ and $C_{22}$ respectively to obtain a second pair of pilot signals ($C_{21}RS_{21}(i)$ and $C_{22}RS_{22}(i)$), and on the basis, in order to randomize interference, $C_{21}RS_{21}(i)$ and $C_{22}RS_{22}(i)$ in the second pair of pilot signals may undergo further cyclic shift to obtain sequences $C_{21}RS_{21}(i)$ and $C_{22}RS_{22}(i)$, respectively, and the obtained sequences are mapped onto two corresponding pilot SC-FDMA symbols. Finally, after other possible processing such as inter-cell interference coordination and interference randomization, five SC-FDMA symbols for data part transmission and two SC-FDMA symbols for transmission of pilot portion in the first timeslot undergo OFDM modulation, and are then transmitted from the second antenna array.

It should be noted that in the pilot part of the two antenna arrays, [$RS_1(0)$, $RS_1(1)$, . . . , $RS_1(11)$] is orthogonal to [$RS_2(0)$, $RS_2(1)$, . . . , $RS_2(11)$]; or [$C_{11}$, $C_{12}$] is orthogonal to [$C_{21}$, $C_{22}$,]. For example, [$C_{11}$, $C_{12}$] and [$C_{21}$, $C_{22}$] may be elements in a sequence set {[1,1],[1,−1]}; or, [$RS_1(0)$, $RS_1(1)$, . . . , $RS_1(11)$] is orthogonal to [$RS_2(0)$, $RS_2(1)$, . . . , $RS_2(11)$], and [$C_{11}$, $C_{12}$] is also orthogonal to [$C_{21}$, $C_{22}$]. In addition, in the 12-bit cyclically-shifted sequences, 6 sequences are usable, and two 2-bit sequences [$C_{11}$, $C_{12}$] and [$C_{21}$, $C_{22}$] are included. Therefore, 6*2=12 pairs of pilot signals may exist in total. Each pair of pilot signals is formed by a 12-bit cyclically-shifted sequence and a 2-bit sequence.

It should be noted that in Table 1 and Table 2, the SC-FDMA symbols for data part transmission may have different cyclic shift mappings or the same cyclic shift mapping.

In this embodiment, the first timeslot and the second timeslot may both use a 5-bit extension sequence or a 4-bit extension sequence; or, one timeslot uses a 4-bit extension sequence, and the other timeslot uses a 5-bit extension sequence. Specifically, for format 3, when the length of the extension sequence is 5, specific forms of 5 available extension sequences are shown in Table 3:

TABLE 3

| Sequence No. $n_{oc}$ | Orthogonal sequence $[w_{n_{oc}}(0) \ldots w_{n_{oc}}(N-1)]$ $N = 5$ |
|---|---|
| 0 | $[1\ 1\ 1\ 1\ 1]$ |
| 1 | $[1\ e^{j2\pi/5}\ e^{j4\pi/5}\ e^{j6\pi/5}\ e^{j8\pi/5}]$ |
| 2 | $[1\ e^{j4\pi/5}\ e^{j8\pi/5}\ e^{j2\pi/5}\ e^{j6\pi/5}]$ |
| 3 | $[1\ e^{j6\pi/5}\ e^{j2\pi/5}\ e^{j8\pi/5}\ e^{j4\pi/5}]$ |
| 4 | $[1\ e^{j8\pi/5}\ e^{j6\pi/5}\ e^{j4\pi/5}\ e^{j2\pi/5}]$ |

In addition, for format 3, the length of the extension sequence may also be 4. Therefore, in the 4-bit extension sequences, 4 extension sequences may be available, and their specific forms are shown in Table 4:

TABLE 4

| Number $n_{oc}$ | Orthogonal sequence $[w_{n_{oc}}(0) \ldots w_{n_{oc}}(N-1)]$ $N = 4$ |
|---|---|
| 0 | $[+1\ +1\ +1\ +1]$ |
| 1 | $[+1\ -1\ +1\ -1]$ |
| 2 | $[+1\ +1\ -1\ -1]$ |
| 3 | $[+1\ -1\ -1\ +1]$ |

In this embodiment, the implementation of transmitting [q(11), q(1), . . . , q(23)] in the second timeslot through the first antenna array and the second antenna array is similar to the implementation of transmitting [q(0), q(1), . . . , q(11)] in the first timeslot through the first antenna array and the second antenna array, and details are not repeated herein.

In this embodiment, for the same PRB corresponding to the first antenna array and the second antenna array, the first antenna array and the second antenna array of each transmitting terminal needs the same 5-bit extension sequence [w(0), w(1), . . . , w(4)]. In addition, because there are 5 mutually orthogonal extension sequences, from the perspective of the data part of a timeslot, the same PRB can simultaneously bear PUCCHs transmitted by 5 transmitting terminals. In addition, two antenna arrays of each transmitting terminal each need a pair of pilot signals, and there are 12 pairs of pilot signals in total. Therefore, from the perspective of the pilot part of the timeslot, the same PRB can simultaneously bear PUCCHs transmitted by 6 transmitting terminals. In summary, the same PRB can simultaneously bear PUCCHs transmitted by min(5, 6)=5 transmitting terminals, and thereby resource utilization is improved effectively.

In addition, it is assumed that, when each of the two antenna arrays of the transmitting terminal includes one antenna, the first antenna array transmits a(i)q(i), and a channel fading coefficient to a receiving terminal is $h_1$; the second antenna array transmits d(i)q(i), and the channel fading coefficient to the receiving terminal is $h_2$. For q(i), the signal received by the receiving terminal is $h_1*a(i)q(i)+h_2*d(i)q(i)=[h_1*a(i)+h_2*d(i)]*q(i)$, where $h_1*a(i)q(i)$ is the signal transmitted from the first antenna array to the receiving terminal, $h_2*d(i)q(i)$ is the signal transmitted from the second antenna array to the receiving terminal, and $[h_1*a(i)+h_2*d(i)]$ is an overall channel fading coefficient of signals transmitted from the two antenna arrays to the receiving terminal with respect to q(i). In a(i)+d(i), there is at least one pair of a(j)+d(j) and a(k)+d(k) whose moduli are unequal. Therefore, the power of overall channel fading coefficients corresponding to all q(i) is not necessarily very small. For example, assuming a(i)=1, when $$d(i) = \begin{cases} 1 & i = 2n \\ -1 & i = 2n+1 \end{cases},$$

the overall channel fading coefficient of some q(i) is $[h_1+h_2]$, and the overall channel fading coefficient of other q(i) is $[h_1-h_2]$. More specifically, assuming $h_1=10$ and $h_2=-9.9$, when $h_1+h_2=0.1$, the performance in receiving some q(i) is poor, and when $h_1-h_2=19.9$, the performance in receiving some q(i) is good. In summary, no matter how the channel fading coefficient $h_1$ from the first antenna array to the receiving terminal is related to the channel fading coefficient $h_2$ from the second antenna array to the receiving terminal, in this embodiment, the overall channel fading coefficient of at least some q(i) is good for the receiving performance. Therefore, from the perspective of the transmitting terminal, the overall performance is improved effectively.

It should be noted that in this embodiment, both $h_1$ and $h_2$ are complex numbers, where a real number is a special complex number.

In this embodiment, a second data symbol sequence and a third data symbol sequence are obtained according to a first data symbol sequence to be transmitted in a first timeslot and coefficients a(i) and d(i), the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, two antenna arrays of each transmitting terminal can share time-frequency resources, and each antenna array can use the same extension sequence. Therefore, resource utilization is improved effectively. In addition, because there are 5 mutually orthogonal extension sequences, from the perspective of the data part of a timeslot, the same PRB can simultaneously bear PUCCHs transmitted by 5 transmitting terminals. In addition, two antenna arrays of each transmitting terminal each need a pair of pilot signals, and there are 12 pairs of pilot signals in total. Therefore, from the perspective of the pilot part of the timeslot, the same PRB can simultaneously bear PUCCHs transmitted by 6 transmitting terminals. In summary, the same PRB can simultaneously bear PUCCHs transmitted by min(5, 6)=5 transmitting terminals, and thereby resource utilization is improved effectively.

Further, in another embodiment of the present invention, when the data symbols in the first data symbol sequence are formed by P data symbol sets, and the P data symbol sets are obtained by performing channel coding and modulation on P information bit sets, respectively. Therefore, in step 201, in a(i)+d(i), at least one pair of a(u)+d(u) and a(v)+d(v) have unequal moduli, as detailed below:

In $a_k(i)+d_k(i)$, at least one pair of $a_k(u)+d_k(u)$ and $a_k(v)+d_k(v)$ have unequal moduli, where $a_k(i)$ and $d_k(i)$ are coefficients corresponding to the $k^{th}$ data symbol set in the P data symbol sets, and $a_k(i)$ and $d_k(i)$ belong to a(i) and d(i), respectively, where, P and k are integers.

For example, it is assumed that in this embodiment, when the information bits of the transmitting terminal are encoded and transmitted by means of dual-RM codes, the information bits (such as [X(0), . . . , X(A)]) may be grouped into two sets (such as [X(0), . . . , X(k)] and [X(k+1), . . . , X(A)]), and each set is encoded to obtain 24 codeword bits, which may be expressed as [$b_1(0)$, $b_1(1)$, . . . , $b_1(23)$] and [$b_2(0)$, $b_2(1)$, . . . , $b_2(23)$], respectively. Every two codeword bits in each codeword bit set are modulated to obtain a data symbol (such as QPSK symbol). Therefore, two data symbol sequences [$B_1(0)$, $B_1(1)$, . . . , $B_1(11)$] and [$B_2(0)$, $B_2(1)$, . . . , $B_2(11)$] are obtained in total. Subsequently, the 24 data symbols are grouped into two sets, expressed as [q(0), q(1), . . . , q(11)] and [q(12), q(13), . . . , q(23)], where each set includes at least one data symbol from [$B_1(0)$, $B_1(1)$, . . . , $B_1(11)$] and at least one data symbol from [$B_2(0)$, $B_2(1)$, . . . , $B_2(11)$], where [q(0), q(1), . . . , q(11)] may be transmitted in the first timeslot over the control channel, and [q(12), q(13), . . . , q(23)] may be transmitted in the second timeslot over the control channel. Therefore, on the basis of the embodiment illustrated in FIG. 2, step 201 may be detailed as follows:

It is assumed that in the coefficient sequences a(i) and d(i) corresponding to the first data symbol sequence, $a_k(i)$ and $d_k(i)$ are coefficients corresponding to the data symbols that come from [$B_k(0)$, $B_k(1)$, . . . , $B_k(11)$] in the first data symbol sequence. Therefore, in $a_k(i)+d_k(i)$, at least one pair of $a_k(u)+d_k(u)$ and $a_k(v)+d_k(v)$ have unequal moduli. Or, equivalently, data symbols that come from [$B_1(0)$, $B_1(1)$, . . . , $B_1(11)$] in the first data symbol sequence [q(0), q(1), . . . , q(11)] are multiplied by coefficients $a_1(i)$ and $d_1(i)$ to obtain two data symbol sequences, respectively; and then data symbols that come from [$B_2(0)$, $B_2(1)$, . . . , $B_2(11)$] in the first data symbol sequence [q(0), q(1), . . . , q(11)] are multiplied by coefficients $a_2(i)$ and $d_2(i)$ to obtain two data symbol sequences, respectively; in addition, in $a_k(i)+d_k(i)$, at least one pair of $a_k(u)+d_k(u)$ and $a_k(v)+d_k(v)$ have unequal moduli, where k=1, 2. Subsequently, the data symbols corresponding to the coefficients $a_1(i)$ and $a_2(i)$ are arranged according to their order in [q(0), q(1), . . . , q(11)] to obtain a second data symbol sequence, and the data symbols corresponding to the coefficients $d_1(i)$ and $d_2(i)$ are arranged according to their order in [q(0), q(1), . . . , q(11)] to obtain a third data symbol sequence.

Figure 4:
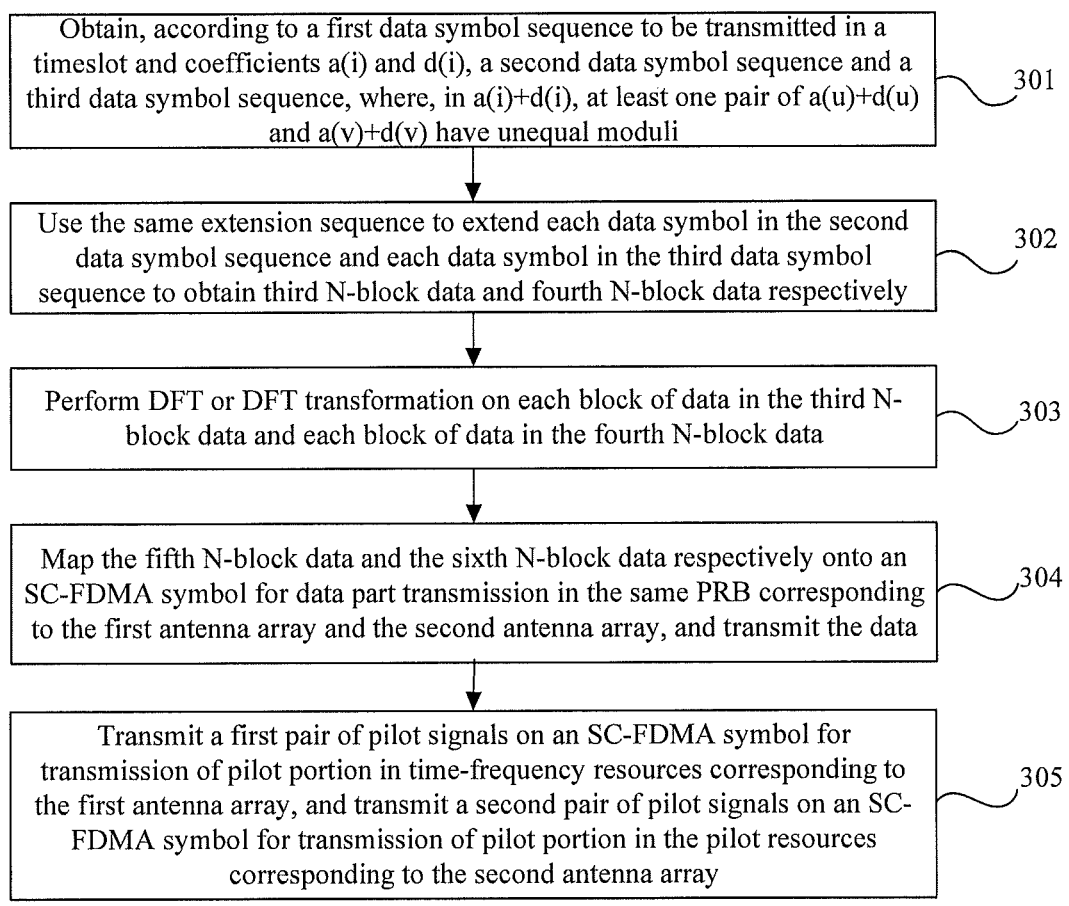
FIG. 4 is a flowchart of a communication method for a control channel according to another embodiment of the present invention.

FIG. 4 is a flowchart of a communication method for a control channel according to another embodiment of the present invention. In this embodiment, format 3 is taken as an example. Specifically, the antennas of the transmitting terminal are grouped into two arrays to obtain a first antenna array and a second antenna array. Each antenna array includes at least one antenna. Channel coding (Channel coding), scrambling (scrambling), and QPSK modulation are performed on information bits received by the user equipment to obtain [q(0), q(1), . . . , q(23)], where [q(0), q(1), . . . , q(11)] may be transmitted in the first timeslot over the control channel, and [q(12), q(13), . . . , q(23)] may be transmitted in the second timeslot over the control channel. By assuming that [q(0), q(1), . . . , q(11)] is transmitted in the first timeslot, this embodiment describes the technical solutions of the present invention in detail. As shown in FIG. 4, the method in this embodiment includes the following:

Step 301: Obtain, according to a first data symbol sequence [q(0), q(1), . . . , q(11)] to be transmitted in a timeslot and coefficients a(i) and d(i), a second data symbol sequence [a(0)q(0), a(1)q(1), . . . , a(11)q(11)] and a third data symbol sequence [d(0)q(0), d(1)q(1), . . . , d(11)q(11)], where, in a(i)+d(i), at least one pair of a(u)+d(u) and a(v)+d(v) have unequal moduli.

Specifically, i, u, and v are integers, 0≤i≤M−1, 0≤u≤M−1, 0≤v≤M−1, and u≠v.

Step 302: Use the same extension sequence [w(0), w(1), . . . , w(4)] to extend each data symbol a(i)q(i) in the second data symbol sequence and each data symbol d(i)q(i) in the third data symbol sequence to obtain third N-block data [a(0)q(0)w(m), a(1)q(1)w(m), . . . , a(11)q(11)w(m)] and fourth N-block data [d(0)q(0)w(m), d(1)q(1)w(m), . . . , d(11)q(11)w(m)], respectively.

Step 303: Perform DFT or DFT transformation on each block of data in the third N-block data and each block of data in the fourth N-block data to obtain fifth N-block data [$Q_1(0)$w(m), $Q_1(1)$w(m), . . . , $Q_1(11)$w(m)] and sixth N-block data [$Q_2(0)$w(m), $Q_2(1)$w(m), . . . , $Q_2(11)$w(m)], respectively.

Step 304: Map the fifth N-block data and the sixth N-block data respectively onto the $(m+1)^{th}$ SC-FDMA symbol for data part transmission in the same PRB corresponding to the first antenna array and the second antenna array, and transmit the data.

In this embodiment, specifically, cyclic shift may be further performed on the fifth N-block data to obtain:
[$Q_1(i)$w(m), $Q_1(i+1)$w(m), . . . $Q_1(11)$w(m), $Q_1(0)$w(m), $Q_1(1)$w(m), . . . , $Q_1(M-1)$w(m)]

Finally, the sequence is mapped onto the $(m+1)^{th}$ SC-FDMA symbol for data part transmission in the PRB corresponding to the first antenna array, and is transmitted. It should be noted that other equivalent implementation may achieve the same effect of cyclic shift. Taking the first antenna array as an example, according to the nature of DFT/FFT transformation, each data a(k)q(k)w(m) in [a(0)q(0)w(m), a(1)q(1)w(m), . . . , a(11)q(11)w(m)] may be multiplied by $$\exp\left(\frac{j2\pi ik}{12}\right),$$

and then DFT/FFT transformation is performed on the obtained sequence again to obtain the following sequence:
[$Q_1(i)$w(m), $Q_1(i+1)$w(m), . . . $Q_1(11)$w(m), $Q_1(0)$w(m), $Q_1(1)$w(m), . . . , $Q_1(M-1)$w(m)]

All equivalent implementation shall fall within the protection scope of the present invention, and details are not described herein. A specific form of mapping the sequence onto the $(m+1)^{th}$ SC-FDMA symbol for data part transmission in the PRB may also be shown in Table 1, and is not repeated herein any further.

Step 305: Transmit a first pair of pilot signals on an SC-FDMA symbol for transmission of pilot portion in the time-frequency resources corresponding to the first antenna array, and transmit a second pair of pilot signals on an SC-FDMA symbol for transmission of pilot portion in the pilot resources corresponding to the second antenna array.

In this embodiment, a second data symbol sequence and a third data symbol sequence are obtained according to an obtained first data symbol sequence and coefficients a(i) and d(i), the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, two antenna arrays of each transmitting terminal can share time-frequency resources, and each antenna array can use the same extension sequence. Therefore, resource utilization is improved effectively. In addition, because there are 5 mutually orthogonal extension sequences, from the perspective of the data part of a timeslot, the same PRB can simultaneously bear PUCCHs transmitted by 5 transmitting terminals. In addition, two antenna arrays of each transmitting terminal each need a pair of pilot signals, and there are 12 pairs of pilot signals in total. Therefore, from the perspective of the pilot part of the timeslot, the same PRB can simultaneously bear PUCCHs transmitted by 6 transmitting terminals. In summary, the same PRB can simultaneously bear PUCCHs transmitted by min (5, 6)=5 transmitting terminals, and thereby resource utilization is improved effectively.

Further, in each of the foregoing embodiments of the present invention, it should be noted that when receiving data transmitted by a transmitting terminal, each receiving antenna of a receiving terminal performs a reverse operation (generally, analog/digital conversion, FFT, or the like) of OFDM modulation on the data, to obtain data transmitted by the transmitting terminal and borne on subcarriers of the SC-FDMA symbols of a PRB where the control channel is located, and de-extends all received data corresponding to each q(i) by using the extension sequence [w(0), w(1), . . . , w(4)]. A channel from each antenna array to the receiving antenna is estimated according to the pilot transmitted by each of the two antenna arrays. The channel from each of the two antenna arrays to the receiving antenna is estimated by using the data obtained by de-extension, and the coefficients a(i) and d(i) used by each antenna array are demodulated to obtain a data symbol q(i).

Figure 5:
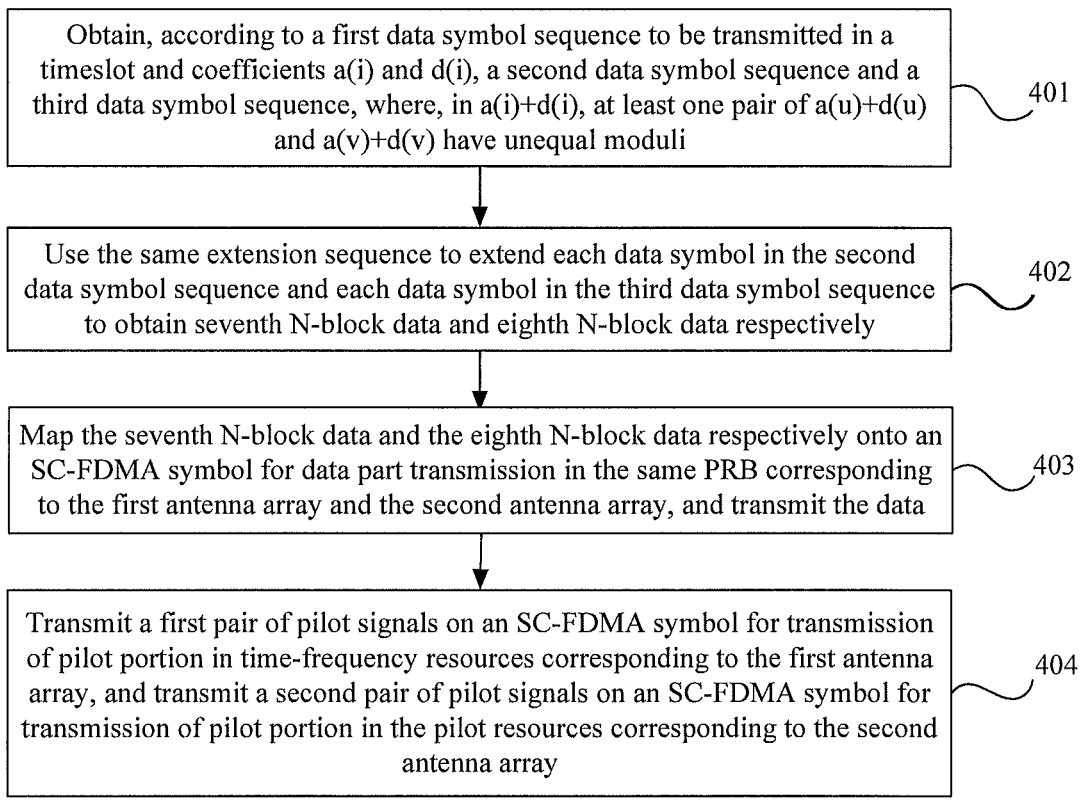
FIG. 5 is a flowchart of a communication method for a control channel according to another embodiment of the present invention.

FIG. 5 is a flowchart of a communication method for a control channel according to another embodiment of the present invention. In this embodiment, PUCCH format 3 is taken as an example. Specifically, the antennas of the transmitting terminal are grouped into two arrays to obtain a first antenna array and a second antenna array. Each antenna array includes at least one antenna. Channel coding (Channel coding), scrambling (scrambling), QPSK modulation, and DFT transformation are performed on information bits received by the user equipment to obtain [q(0), q(1), . . . , q(23)], where [q(0), q(1), . . . , q(11)] may be transmitted in the first timeslot over the control channel, and [q(12), q(13), . . . , q(23)] may be transmitted in the second timeslot over the control channel. By assuming that [q(0), q(1), . . . , q(11)] is transmitted in the first timeslot, this embodiment describes the technical solutions of the present invention in detail. As shown in FIG. 5, the method in this embodiment includes the following:

Step 401: Obtain, according to a first data symbol sequence [q(0), q(1), . . . , q(11)] to be transmitted in a timeslot and coefficients a(i) and d(i), a second data symbol sequence [a(0)q(0), a(1)q(1), . . . , a(11)q(11)] and a third data symbol sequence [d(0)q(0), d(1)q(1), . . . , d(11)q(11)], where, in a(i)+d(i), at least one pair of a(u)+d(u) and a(v)+d(v) have unequal moduli, where, i, u, and v are integers, 0≤i≤M−1, and u≠v.

Step 402: Use the same extension sequence [w(0), w(1), . . . , w(4)] to extend each data symbol a(i)q(i) in the second data symbol sequence and each data symbol d(i)q(i) in the third data symbol sequence to obtain seventh N-block data [a(0)q(0)w(m), a(1)q(1)w(m), . . . , a(11)q(11)w(m)] and eighth N-block data [d(0)q(0)w(m), d(1)q(1)w(m), . . . , d(11)q(11)w(m)], respectively.

Step 403: Map the seventh N-block data and the eighth N-block data respectively onto the (m+1)$^{th}$ SC-FDMA symbol for data part transmission in the same PRB corresponding to the first antenna array and the second antenna array, and transmit the data.

Step 404: Transmit a first pair of pilot signals on an SC-FDMA symbol for transmission of pilot portion in the time-frequency resources corresponding to the first antenna array, and transmit a second pair of pilot signals on an SC-FDMA symbol for transmission of pilot portion in the pilot resources corresponding to the second antenna array.

Figure 6:
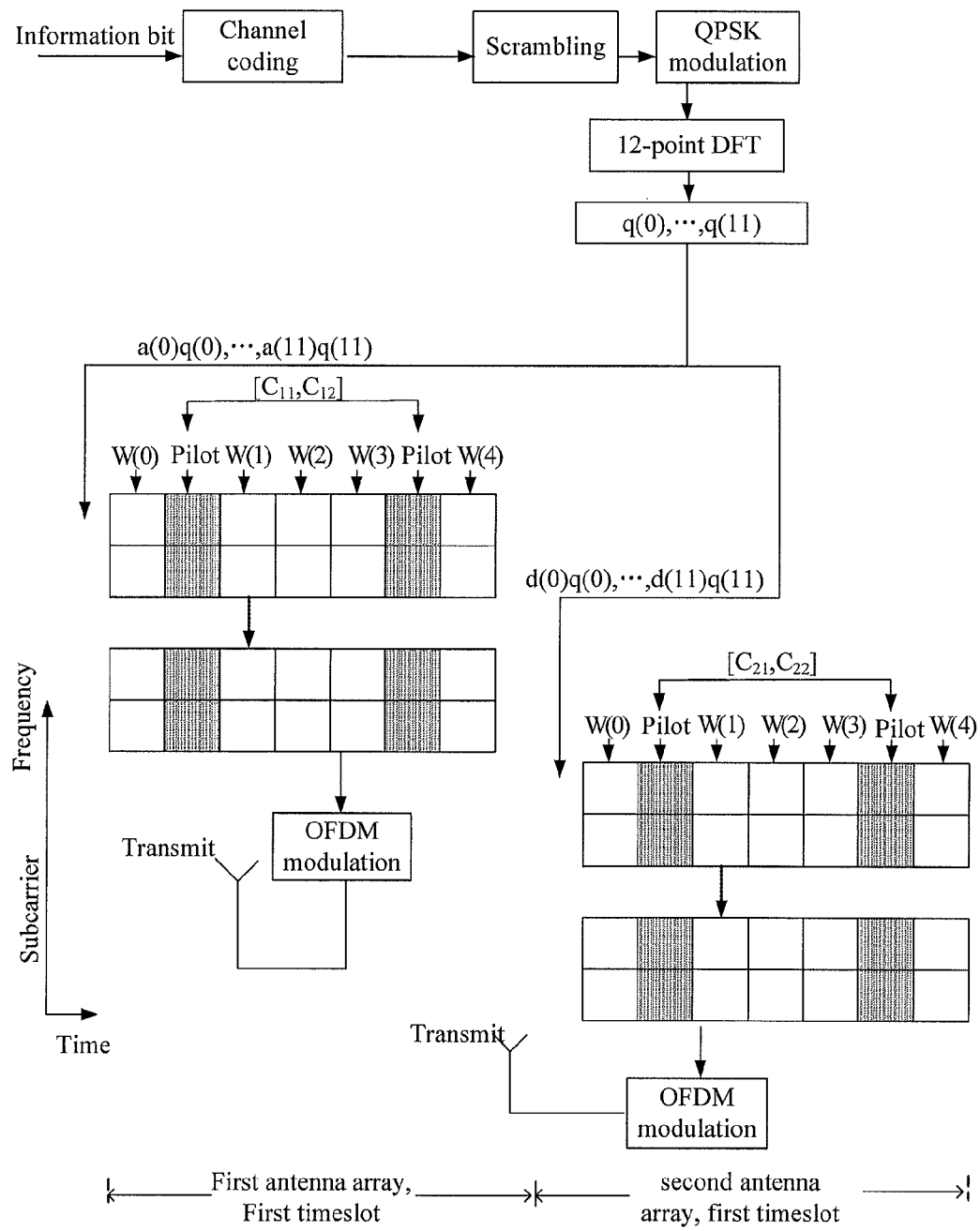
FIG. 6 is a schematic principle diagram of a communication method for a control channel according to an embodiment of the present invention.

Specifically, FIG. 6 is a schematic principle diagram of a communication method for a control channel according to an embodiment of the present invention. As shown in FIG. 6, an extension sequence [w(0), w(1), . . . , w(4)] is used to extend each data symbol a(i)q(i) in the first data symbol sequence to obtain sixth N-block data [a(0)q(0)w(m), a(1)q(1)w(m), . . . , a(11)q(11)w(m)]. Subsequently, the sixth N-block data [a(0)q(0)w(m), a(1)q(1)w(m), . . . , a(11)q(11)w(m)] is mapped onto the (m+1)$^{th}$ SC-FDMA symbol for data part transmission in the PRB corresponding to the first antenna array. It should be noted that, in this embodiment, before the sixth N-block data [a(0)q(0)w(m), a(1)q(1)w(m), . . . , a(11)q(11)w(m)] is mapped onto the (m+1)$^{th}$ SC-FDMA symbol for data part transmission in the PRB corresponding to the first antenna array, cyclic shift may first be performed on the sixth N-block data [a(0)q(0)w(m), a(1)q(1)w(m), . . . , a(11)q(11)w(m)], and then a data block obtained by the cyclic shift is mapped onto the (m+1)$^{th}$ SC-FDMA symbol for data part transmission in the PRB corresponding to the first antenna array. A specific form may be shown in the above Table 1, and is not repeated herein any further.

An extension sequence [w(0), w(1), . . . , w(4)] is used to extend each data symbol d(i)q(i) in the second data symbol sequence to obtain seventh N-block data [d(0)q(0)w(m), d(1)q(1)w(m), . . . , d(11)q(11)w(m)]. Subsequently, the seventh N-block data [d(0)q(0)w(m), d(1)q(1)w(m), . . . , d(11)q(11)w(m)] is mapped onto the (m+1)$^{th}$ SC-FDMA symbol for data part transmission in the PRB corresponding to the second antenna array. It should be noted that, in this embodiment, before the seventh N-block data [d(0)q(0)w(m), d(1)q(1)w(m), . . . , d(11)q(11)w(m)] is mapped onto the (m+1)$^{th}$ SC-FDMA symbol for data part transmission in the PRB corresponding to the second antenna array, cyclic shift may first be performed on the seventh N-block data [d(0)q(0)w(m), d(1)q(1)w(m), . . . , d(11)q(11)w(m)], and then a data block obtained by the cyclic shift is mapped onto the (m+1)$^{th}$ SC-FDMA symbol for data part transmission in the PRB corresponding to the second antenna array. A specific form may be shown in the above Table 2, and is not repeated herein any further.

More specifically, coefficient a(i)=1, and coefficient $$d(i) = \begin{cases} 1 & i = 2n \\ -1 & i = 2n+1; \end{cases}$$

or

Coefficient a(i)=1, and coefficient $$d(i) = \exp\left(\frac{j2\pi * \gamma_1 * i}{M}\right);$$

or
Coefficient a(i)=1, and coefficient $$d(i) = \begin{cases} 1 & i = 4n \\ -1 & i = 4n+1 \\ j & i = 4n+2 \\ -j & i = 4n+3; \end{cases}$$

or
Coefficient $$d(i) = \exp\left(\frac{j2\pi * \gamma_1 * i}{M}\right),$$

and coefficient $$d(i) = \exp\left(\frac{j2\pi * \gamma_2 * i}{M}\right),$$

where, n, $\gamma_1$, and $\gamma_2$ are integers, $0 \le 2n \le M-1$, $0 \le 2n+1 \le M-1$, $0 \le 4n \le M-1$, $0 \le 4n+1 \le M-1$, $0 \le 4n+2 \le M-1$, $0 \le 4n+3 \le M-1$, and $\gamma_1 \ne \gamma_2$.

It should be noted that, in this embodiment, the settings of a(i) and d(i) need to ensure a single-carrier feature of a signal obtained by performing OFDM modulation (or SC-OFDM modulation) on a(i)q(i) and d(i)q(i) transmitted by the transmitting terminal, so that the efficiency of components such as a power amplifier in the transmitting terminal is not affected.

In addition, as shown in the above Table 1, two SC-FDMA symbols (pilot 1 and pilot 2) for transmission of pilot portion exist in the PRB. In this embodiment, cyclic shift may be performed on a 12-bit root sequence to obtain a cyclically-shifted sequence $RS_1(i)$, where i=0, 1, . . . , 11; the cyclically-shifted sequence is multiplied by coefficients $C_{11}$ and $C_{12}$ respectively to obtain a first pair of pilot signals ($C_{11}RS_1(i)$ and $C_{12}RS_1(i)$, and on the basis, in order to avoid randomized interference, $C_{11}RS_1(i)$ and $C_{12}RS_1(i)$ in the first pair of pilot signals may further be cyclically shifted to obtain $C_{11}RS_{11}(i)$ and $C_{12}RS_{12}(i)$, respectively, and finally, $C_{11}RS_{11}(i)$ and $C_{12}RS_{12}(i)$ are mapped onto two corresponding pilot SC-FDMA symbols. Finally, after other possible processing such as inter-cell interference coordination and interference randomization, five SC-FDMA symbols for data part transmission and two SC-FDMA symbols for transmission of pilot portion in the first timeslot undergo OFDM modulation, and are then transmitted from the first antenna array.

As shown in the above Table 2, two SC-FDMA symbols (pilot 1 and pilot 2) for transmission of pilot portion exist in the PRB. In this embodiment, cyclic shift may be performed on a 12-bit root sequence to obtain a cyclically-shifted sequence $RS_2(i)$, where i=0, 1, . . . , 11; the cyclically-shifted sequence is multiplied by coefficients $C_{21}$ and $C_{22}$ to obtain a second pair of pilot signals ($C_{21}RS_{21}(i)$ and $C_{22}RS_{22}(i)$), and on the basis, in order to avoid randomized interference, $C_{21}RS_{21}(i)$ and $C_{22}RS_{22}(i)$ in the first pair of pilot signals may further be cyclically shifted each, and the obtained $C_{21}RS_{21}(i)$ and $C_{22}RS_{22}(i)$ are mapped onto two corresponding pilot SC-FDMA symbols. Finally, after other possible processing such as inter-cell interference coordination and interference randomization, five SC-FDMA symbols for data part transmission and two SC-FDMA symbols for transmission of pilot portion in the first timeslot undergo OFDM modulation, and are then transmitted from the second antenna array.

It should be noted that in the pilot part of the two antenna arrays, $[RS_1(0), RS_1(1), \ldots, RS_1(11)]$ is orthogonal to $[RS_2(0), RS_2(1), \ldots, RS_2(11)]$; or $[C_{11}, C_{12}]$ is orthogonal to $[C_{21}, C_{22}]$. For example, $[C_{11}, C_{12}]$ and $[C_{21}, C_{22}]$ may be elements in a sequence set $\{[1,1][1,-1]\}$; or, $[RS_1(0), RS_1(1), \ldots, RS_1(11)]$ is orthogonal to $[RS_2(0), RS_2(1), \ldots, RS_2(11)]$, and $[C_{11}, C_{12}]$ is also orthogonal to $[C_{21}, C_{22}]$. In addition, in the 12-bit cyclically-shifted sequences, 6 sequences are usable, and two 2-bit sequences $[C_{11}, C_{12}]$ and $[C_{21}, C_{22}]$ are included. Therefore, 6*2=12 pairs of pilot signals may exist in total. Each pair of pilot signals is formed by a 12-bit cyclically-shifted sequence and a 2-bit sequence.

In this embodiment, a second data symbol sequence and a third data symbol sequence are obtained according to a first data symbol sequence to be transmitted in a timeslot and coefficients a(i) and d(i), the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, two antenna arrays of each transmitting terminal can share time-frequency resources, and each antenna array can use the same extension sequence. Therefore, resource utilization is improved effectively. In addition, because there are 5 mutually orthogonal extension sequences, from the perspective of the data part of a timeslot, the same PRB can simultaneously bear PUCCHs transmitted by 5 transmitting terminals. In addition, two antenna arrays of each transmitting terminal each need a pair of pilot signals, and there are 12 pairs of pilot signals in total. Therefore, from the perspective of the pilot part of the timeslot, the same PRB can simultaneously bear PUCCHs transmitted by 6 transmitting terminals. In summary, the same PRB can simultaneously bear PUCCHs transmitted by min(5, 6)=5 transmitting terminals, and thereby resource utilization is improved effectively.

Further, taking the embodiment illustrated in FIG. 5 as an example, the data obtained by a receiving antenna from subcarriers of SC-FDMA symbols may be expressed as:

$$y = h_1 * a(i)q(i) * w(m) + h_2 * d(i) * w(m) + N(m)$$

$$= [h_1 * a(i) + h_2 * d(i)] * q(i) * w(m) + N(m)$$

where $h_1$ is a channel fading coefficient from the first antenna array to the receiving antenna, $h_2$ is a fading coefficient from the second antenna array to the receiving antenna, and N(m) is a noise interference term. Subsequently, all data corresponding to the data q(i)*w(m) and existing on the receiving terminal may be collected and de-extended by using the extension sequence [w(0), w(1), . . . w(4)].

In addition, the receiving terminal learns which subcarrier of which SC-FDMA symbol of the PRB, where the control channel is located, the data obtained by extending the same data symbol q(i) on the transmitting terminal is placed on (or mapped onto). Therefore, the receiving terminal learns which data on the receiving terminal corresponds to the data q(i)*w(m) obtained by de-extending the same data q(i). The data on the receiving terminal corresponding to the data q(i)*w(m) obtained by de-extending the same data q(i) may be expressed as $[h_1*a(i)+h_2*d(i)]*q(i)*w(m)+N(k)$, where m=0, 1, ..., 4.

For example, an extension sequence [w(0), w(1), ... w(4)] is used to perform de-extension. For example, w(m) is multiplied by corresponding received data $[h_1*a(i)+h_2*d(i)]*q(i)*w(m)+N(m)$ and then the products are summed to obtain:

$$\{[h_1*a(i)+h_2*d(i)]*q(i)*w(0)+N(0)\}*w(0)+$$
$$\{[h_1*a(i)+h_2*d(i)]*q(i)*w(1)+N(1)\}*w(1)+\ldots$$
$$\{[h_1*a(i)+h_2*d(i)]*q(i)*w(4)+N(4)\}*$$
$$w(4) = [h_1*a(i)+h_2*d(i)]*q(i)*[w(0)^2+\ldots+w(4)^2]+$$
$$[w(0)N(0)+\ldots+w(4)N(4)]$$

Subsequently, the channel fading coefficient $h_1$ is estimated by using the pilot transmitted by the first antenna array, and the channel fading coefficient $h_2$ is estimated by using the pilot transmitted by the second antenna array. Then, demodulation and decoding are performed by using an estimated channel from the first antenna array to each receiving antenna, an estimated channel from the second antenna array to each receiving antenna, de-extended data corresponding to each q(i) on each receiving terminal, and the coefficients a(i) and d(i) corresponding to each q(i) on each transmitting antenna array.

Specifically, the receiving terminal now learns $h_1$, $h_2$, a(i), d(i), and w(m), and only the data q(i) transmitted by the transmitting terminal and the noise interference term are unknown. Therefore, demodulation and decoding may be performed by using an existing conventional algorithm of the receiving terminal, for example, using a maximum likelihood algorithm. The data obtained by multiple receiving antennas is processed by using a maximal ratio combining (Maximal Ratio Combining, MRC for short) algorithm, or a minimal mean square error (Minimal Mean Square Estimation, MMSE) algorithm, or the like.

Figure 7:
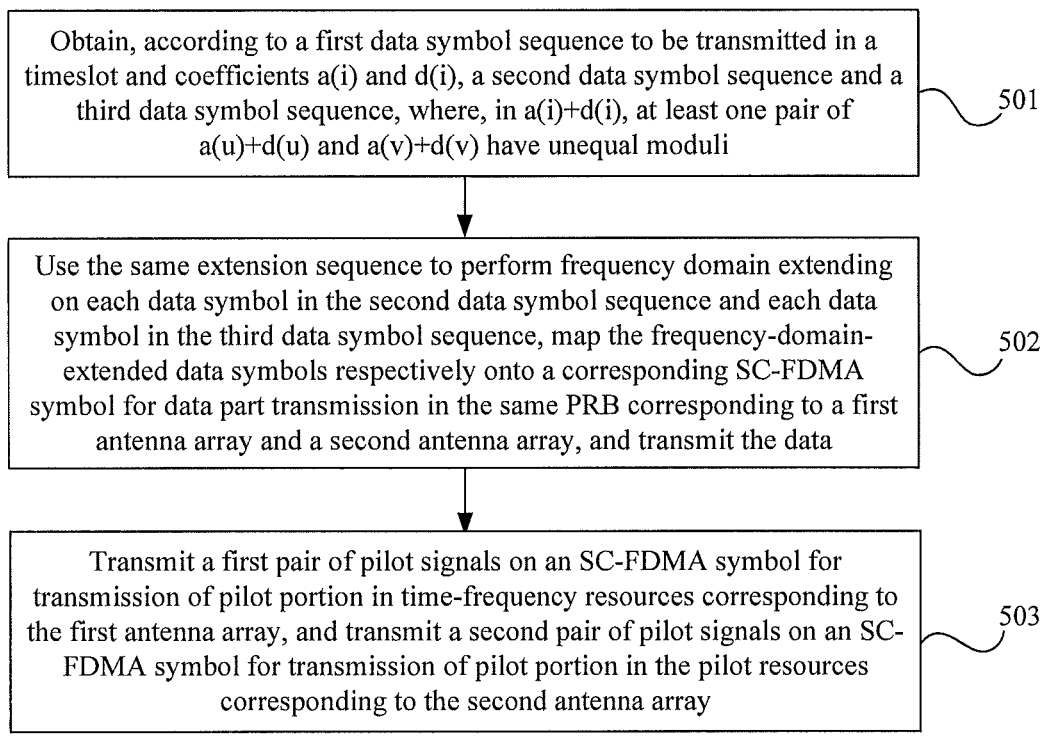
FIG. 7 is a schematic diagram of a communication method for a control channel according to another embodiment of the present invention.

FIG. 7 is a schematic diagram of a communication method for a control channel according to another embodiment of the present invention. In this embodiment, PUCCH format 2 is taken as an example. Specifically, in this embodiment, PUCCH format 2 is primarily used to transmit channel quality indicator (Channel Quality Indicator, CQI for short) information. In this format, one timeslot (slot) occupies one PRB defined by 3GPP LTE/LTE-A, where the PRB includes 5 SC-FDMA symbols for carrying data and 2 SC-FDMA symbols for carrying pilot signals. More specifically, each SC-FDMA symbol in the data part of the PRB corresponds to a quaternary phase shift keying (Quaternary Phase Shift Keying, QPSK for short) modulation symbol, and each QPSK modulation symbol bears 2 bits. Therefore, one timeslot needs to bear 5*2=10 bits in total. In this way, the PUCCH format 2 needs to bear 10 QPSK modulation symbols in each of the two timeslots, that is, 20 bits in total.

In this embodiment, when the transmitting terminal includes multiple antennas, the multiple antennas may be grouped into two arrays: a first antenna array and a second antenna array. Each antenna array may include at least one antenna. It should be noted that the number of antennas included in different antenna arrays may be equal or unequal. It is assumed that 10 QPSK modulation symbols [q(0), q(1), ... q(9)] are obtained. The symbols [q(0), q(1), ... q(9)] are grouped into two sets: [q(0), q(1), ... q(4)] and [q(5), q(6), ... q(9)], where [q(0), q(1), ... q(4)] may be transmitted in a first timeslot of a control channel, and [q(5), q(6), ... q(9)] may be transmitted in a second timeslot of the control channel. By assuming that [q(0), q(1), ... q(4)] is transmitted in the first timeslot, this embodiment describes the technical solutions of the present invention in detail. As shown in FIG. 7, the method in this embodiment includes the following:

Step 501: Obtain, according to a first data symbol sequence [q(0), q(1), ..., q(4)] to be transmitted in a timeslot and coefficients a(i) and d(i), a second data symbol sequence [a(0)q(0), a(1)q(1), ..., a(4)q(4)] and a third data symbol sequence [d(0)q(0), d(1)q(1), ..., d(4)q(4)], where, in a(i)+d(i), at least one pair of a(u)+d(u) and a(v)+d(v) have unequal moduli, where, i=0, 1, ..., 4, 0≤u≤4, 0≤v≤4, and u≠v.

Step 502: Use the same extension sequence [w(0), w(1), ..., w(11)] to extend each data symbol a(i)q(i) in the second data symbol sequence and each data symbol d(i)q(i) in the third data symbol sequence, map the extended data symbols respectively onto the corresponding SC-FDMA symbol for data part transmission in the same PRB corresponding to a first antenna array and a second antenna array, and transmit the data.

Step 503: Transmit a first pair of pilot signals on an SC-FDMA symbol for transmission of pilot portion in the time-frequency resources corresponding to the first antenna array, and transmit a second pair of pilot signals on an SC-FDMA symbol for transmission of pilot portion in the pilot resources corresponding to the second antenna array.

Figure 8:
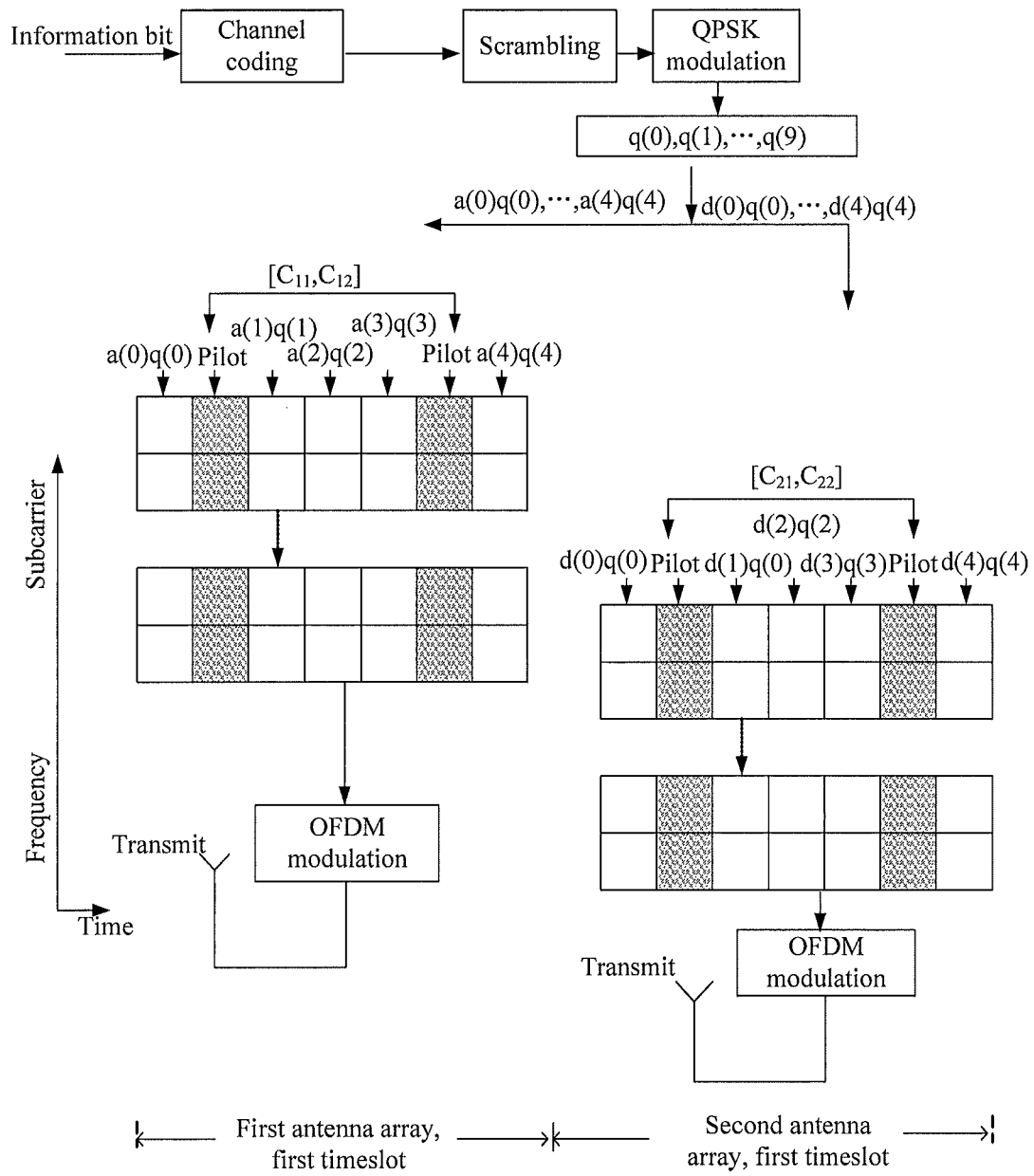
FIG. 8 is a schematic principle diagram of a communication method for a control channel according to an embodiment of the present invention.

Specifically, FIG. 8 is a schematic principle diagram of a communication method for a control channel according to an embodiment of the present invention. As shown in FIG. 8, an extension sequence [w(0), w(1), ..., w(11)] is used to perform frequency domain extending on each data symbol a(i)q(i) in the first data symbol sequence, and then the extended symbols are mapped onto corresponding SC-FDMA symbols for data part transmission in a PRB.

The extension sequence [w(0), w(1), ..., w(11)] is used to perform frequency domain extending on each data symbol d(i)q(i) in the second data symbol sequence, and then the symbols on which frequency domain extending is performed are mapped onto corresponding SC-FDMA symbols for data part transmission in the PRB.

In addition, for the first antenna array, two SC-FDMA symbols for transmission of pilot portion exist in the PRB. In this embodiment, cyclic shift may be performed on a 12-bit root sequence to obtain a cyclically-shifted sequence $RS_1(i)$, where i=0, 1, ..., 11; the cyclically-shifted sequence is multiplied by coefficients $C_{11}$ and $C_{12}$ respectively to obtain a first pair of pilot signals ($C_{11}RS_1(i)$ and $C_{12}RS_1(i)$), and on the basis, in order to randomize interference, $C_{11}RS_1(i)$ and $C_{12}RS_1(i)$ in the first pair of pilot signals may further be cyclically shifted to obtain sequences $C_{11}RS_{11}(i)$ and $C_{12}RS_{12}(i)$, respectively, and the two sequences are mapped onto two corresponding pilot SC-FDMA symbols. Finally, after other possible processing such as inter-cell interference coordination and interference randomization, five SC-FDMA symbols for data part transmission and two SC-FDMA symbols for transmission of pilot portion in the first timeslot undergo OFDM modulation, and are then transmitted from the first antenna array.

For the second antenna array, two SC-FDMA symbols for transmission of pilot portion exist in the PRB. In this embodiment, cyclic shift may be performed on a 12-bit root sequence to obtain a cyclically-shifted sequence $RS_2(i)$, where i=0, 1, ..., 11; the cyclically-shifted sequence is multiplied by coefficients $C_{21}$ and $C_{22}$ respectively to obtain a second pair of pilot signals ($C_{21}RS_{21}(i)$ and $C_{22}RS_{22}(i)$), and on the basis, in order to avoid randomized interference, $C_{21}RS_{21}(i)$ and $C_{22}RS_{22}(i)$ in the second pair of pilot signals of the sequence may further be cyclically shifted to obtain sequences $C_{21}RS_{21}(i)$ and $C_{22}RS_{22}(i)$, respectively, and finally, the two sequences are mapped onto two corresponding pilot SC-FDMA symbols. Finally, after other possible processing such as inter-cell interference coordination and interference randomization, five SC-FDMA symbols for data part transmission and two SC-FDMA symbols for transmission of pilot portion in the first timeslot undergo OFDM modulation, and are then transmitted from the second antenna array.

In this embodiment, a second data symbol sequence and a third data symbol sequence are obtained according to a first data symbol sequence and a(i) and d(i) to be transmitted in a timeslot, the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, two antenna arrays of each transmitting terminal can use the same extension sequence. Therefore, resource utilization is improved effectively. In addition, because there are 5 mutually orthogonal extension sequences, from the perspective of the data part of a timeslot, one PRB can simultaneously bear PUCCHs transmitted by 5 transmitting terminals. In addition, two antenna arrays of each transmitting terminal each need a pair of pilot signals, and there are 12 pairs of pilot signals in total. Therefore, from the perspective of the pilot part of the timeslot, the same PRB can simultaneously bear PUCCHs transmitted by 6 transmitting terminals. In summary, the same PRB can simultaneously bear PUCCHs transmitted by min(5, 6)=5 transmitting terminals, and thereby resource utilization is improved effectively.

Figure 9:
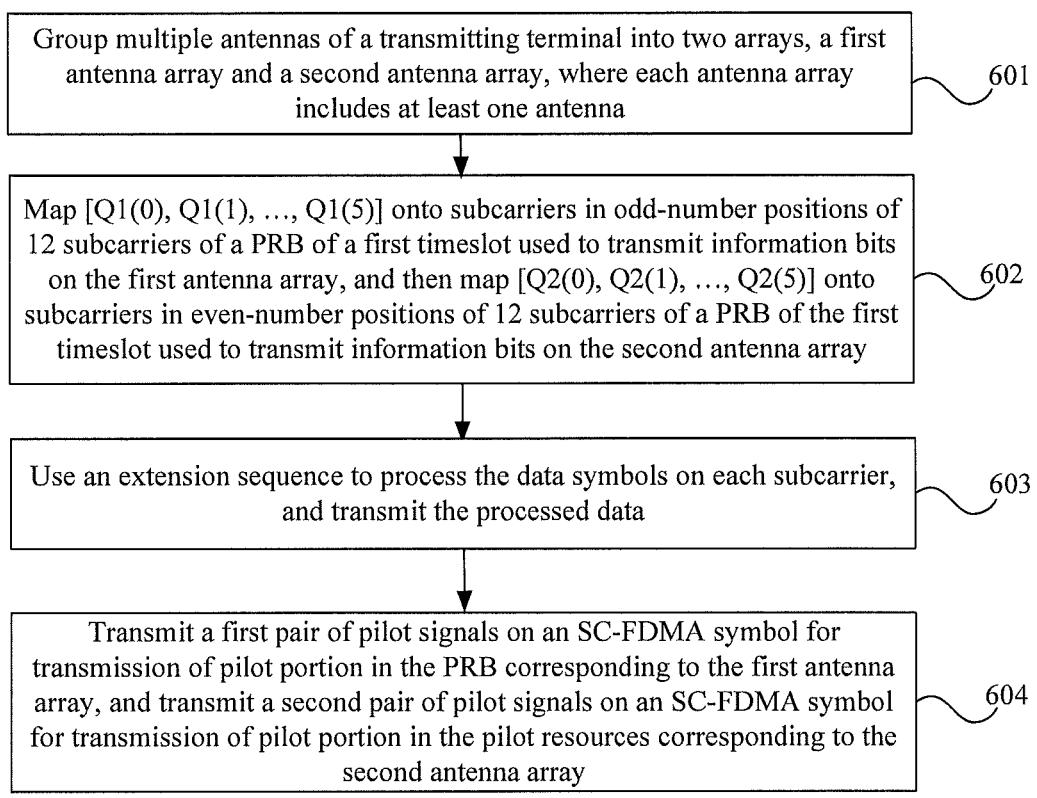
FIG. 9 is a schematic diagram of a communication method for a control channel according to another embodiment of the present invention.
Figure 10:
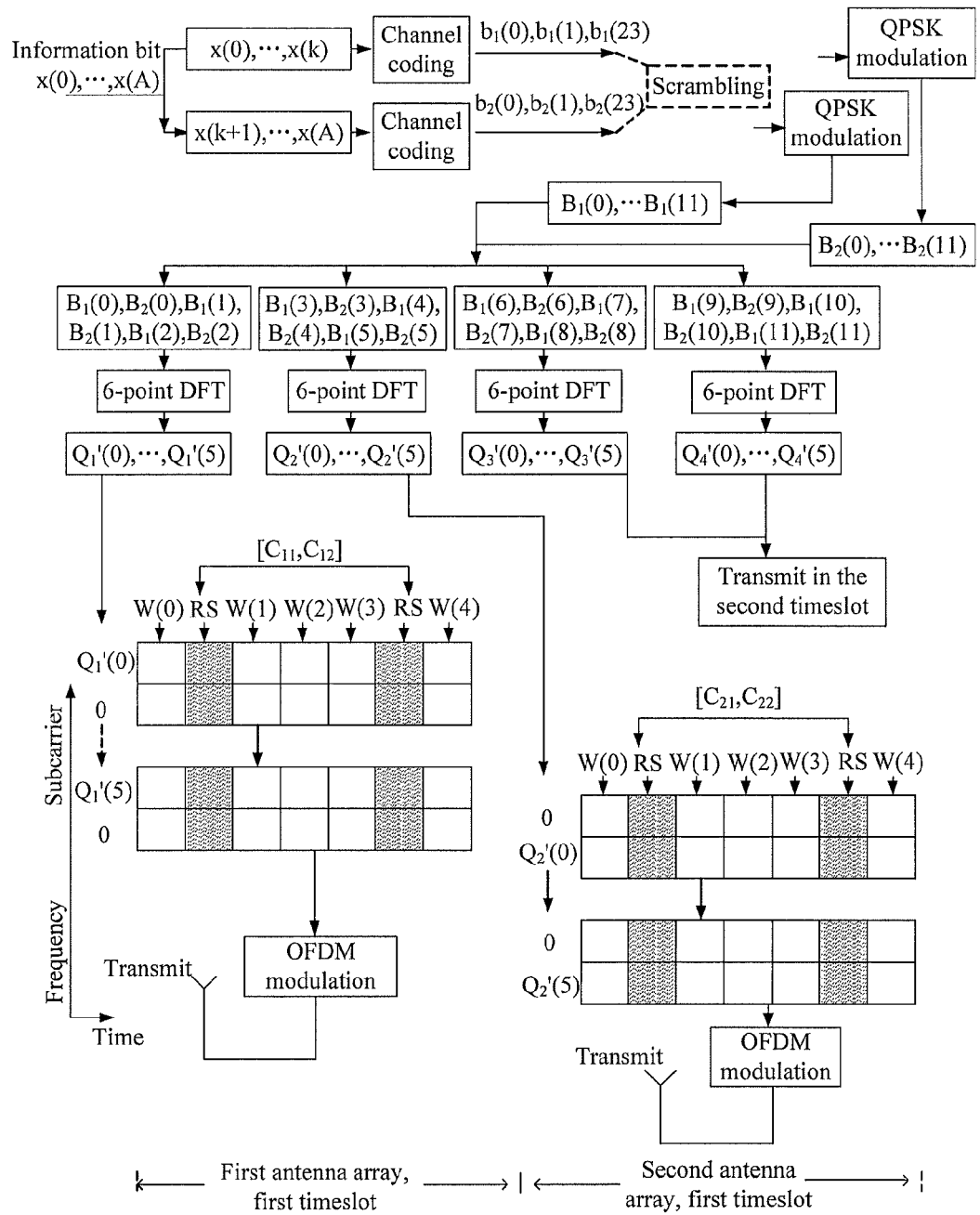
FIG. 10 is a schematic principle diagram of a communication method for a control channel according to an embodiment of the present invention.

FIG. 9 is a schematic diagram of a communication method for a control channel according to another embodiment of the present invention. FIG. 10 is a schematic principle diagram of a communication method for a control channel according to an embodiment of the present invention. As shown in FIG. 10, in this embodiment, when the transmitting terminal has multiple antennas and the information bits (such as [X(0), . . . , X(A)]) of the transmitting terminal are encoded and transmitted by means of dual-RM codes, the information bits may be grouped into two sets (such as [X(0), . . . , X(k)] and [X(k+1), . . . , X(A)]), where each set is encoded to obtain 24 codeword bits so that two codeword bit sets are obtained in total, which may be expressed as [$b_1(0)$, $b_1(1)$, . . . , $b_1(23)$] and [$b_2(0)$, $b_2(1)$, . . . , $b_2(23)$], respectively. Every two codeword bits in each codeword bit set are modulated to obtain a QPSK symbol, and therefore, two QPSK modulation symbol sequences [$B_1(0)$, $B_1(1)$, . . . , $B_1(11)$] and [$B_2(0)$, $B_2(1)$, . . . , $B_2(11)$] are obtained. Subsequently, the 24 QPSK modulation symbols are grouped into four sets, expressed as [$Q_1(0)$, $Q_1(1)$, . . . , $Q_1(5)$], [$Q_2(0)$, $Q_2(1)$, . . . , $Q_2(5)$], [$Q_3(0)$, $Q_3(1)$, . . . , $Q_3(5)$], and [$Q_4(0)$, $Q_4(1)$, . . . , $Q_4(5)$], respectively, where each set includes 6 QPSK modulation symbols, and each set includes at least one modulation symbol from [$B_1(0)$, $B_1(1)$, . . . , $B_1(11)$] and at least one modulation symbol from [$B_2(0)$, $B_2(1)$, . . . , $B_2(11)$]. [$Q_1(0)$, $Q_1(1)$, . . . , $Q_1(5)$] and [$Q_2(0)$, $Q_2(1)$, . . . , $Q_2(5)$] may be transmitted in the first timeslot over the control channel, and [$Q_3(0)$, $Q_3(1)$, . . . , $Q_3(5)$] and [$Q_4(0)$, $Q_4(1)$, . . . , $Q_4(5)$] may be transmitted in the second timeslot over the control channel. By assuming that [$Q_1(0)$, $Q_1(1)$, . . . , $Q_1(5)$] and [$Q_2(0)$, $Q_2(1)$, . . . , $Q_2(5)$] are transmitted in the first timeslot, this embodiment describes the technical solutions of the present invention in detail. As shown in FIG. 9 and FIG. 10, the method in this embodiment further includes the following:

Step 601: Group multiple antennas of the transmitting terminal into two arrays: a first antenna array and a second antenna array, where each antenna array includes at least one antenna.

Step 602: Map [$Q_1(0)$, $Q_1(1)$, . . . , $Q_1(5)$] onto subcarriers in odd-number positions of 12 subcarriers of a PRB of a first timeslot used to transmit information bits on the first antenna array, and then map [$Q_2(0)$, $Q_2(1)$, . . . , $Q_2(5)$] onto subcarriers in even-number positions of 12 subcarriers of the PRB of the first timeslot used to transmit information bits on the second antenna array.

It should be noted that [$Q_3(0)$, $Q_3(1)$, . . . , $Q_3(5)$] is mapped onto subcarriers in odd-number positions or even-number positions of 12 subcarriers of a PRB of a second timeslot used to transmit information bits on the first antenna array, and then [$Q_4(0)$, $Q_4(1)$, . . . , $Q_4(5)$] is mapped onto the subcarriers in even-number positions or odd-number positions of 12 subcarriers of a PRB of the second timeslot used to transmit information bits on the second antenna array.

In addition, it should be noted that, in the PRB used to transmit information bits in each timeslot on each antenna array, 0 may be mapped to a subcarrier that is mapped to no data symbol.

Step 603: Use an extension sequence to process the data symbols on each subcarrier, and transmit the processed data.

Step 604: Transmit a first pair of pilot signals on an SC-FDMA symbol for transmission of pilot portion in the PRB corresponding to the first antenna array, and transmit a second pair of pilot signals on an SC-FDMA symbol for transmission of pilot portion in the pilot resources corresponding to the second antenna array.

In this embodiment, data symbols on each subcarrier are extended by using an extension sequence, and are processed to resist inter-cell interference. For example, data on each SC-FDMA symbol is multiplied by the same phase rotation and/or subcarriers on each SC-FDMA symbol are further multiplied by different phase rotations, and finally, pilot resources are placed. Then, the processed data symbols are modulated by using OFDM modulation and is transmitted.

In this embodiment, it should be noted that two pilot symbols in the same timeslot of each antenna array may be multiplied by coefficients $C_1$ and $C_2$, respectively, where the value of [$C_1$, $C_2$] may be one in the value set {[1, 1], [1, −1]}; or, no coefficient is multiplied; or, the two pilot symbols in the same timeslot of the two antenna arrays are multiplied by the same fixed coefficients $C_1$ and $C_2$, where the value of [$C_1$, $C_2$] is fixedly [1, 1] or [1, −1].

In addition, for the pilot part, the two antenna arrays require two pairs of different pilot signals in total. Each antenna array requires a pair of pilot signals, and the pair of pilot signals include two elements: a 12-bit pilot sequence, and a 2-bit extension sequence [$C_1$, $C_2$]. Two pairs of pilot signals used by the two antenna arrays are orthogonal on at least one element. That is, in two pairs of pilot signals on the two antenna arrays, the 12-bit pilot sequences are orthogonal; or, the 2-bit sequences obtained by multiplying coefficients respectively are orthogonal; or the 12-bit pilot sequences are orthogonal, and the 2-bit sequences are also orthogonal. However, if the same fixed coefficients $C_1$ and $C_2$ are multiplied to two pilot symbols in the same timeslot of the two antenna arrays, where the value of [$C_1$, $C_2$] is fixedly [1, 1] or [1, −1], the 12-bit pilot sequences are required to be orthogonal.

It should be noted that in this embodiment, the method is applicable to different encoding conditions, such as different encoding methods and different code lengths; or the method is also applicable where the number of OFDM symbols for carrying data in each timeslot is different from the number of symbols for carrying pilot symbols.

In this embodiment, multiple antennas of the transmitting terminal are grouped into two arrays: a first antenna array and a second antenna array, where each antenna array includes at least one antenna. Subsequently, [$Q_1(0)$, $Q_1(1)$, ..., $Q_1(5)$] is mapped onto subcarriers in odd-number positions of 12 subcarriers of a PRB of a first timeslot used to transmit information bits on the first antenna array. Then, [$Q_2(0)$, $Q_2(1)$, ..., $Q_2(5)$] is mapped onto subcarriers in even-number positions of 12 subcarriers of a PRB of a first timeslot used to transmit information bits on the second antenna array, and data symbols on each subcarrier are processed by using an extension sequence, and the processed data is transmitted. Finally, a first pair of pilot signals are transmitted on an SC-FDMA symbol for transmission of pilot portion in the PRB corresponding to the first antenna array, and a second pair of pilot signals are transmitted on an SC-FDMA symbol for transmission of pilot portion in the pilot resources corresponding to the second antenna array, thereby improving resource utilization effectively.

Figure 11:
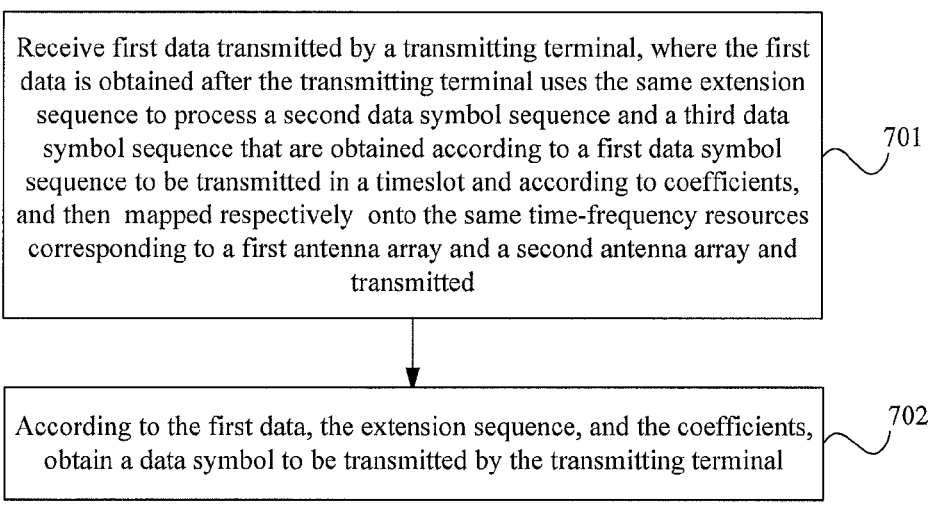
FIG. 11 is a flowchart of a communication method for a control channel according to another embodiment of the present invention.

FIG. 11 is a flowchart of a communication method for a control channel according to another embodiment of the present invention. As shown in FIG. 11, in this embodiment, the control channel includes at least one timeslot, and the method in this embodiment includes the following;

Step 701: Receive first data transmitted by a transmitting terminal, where the first data is obtained after the transmitting terminal uses the same extension sequence [$w(0)$, $w(1)$, ..., $w(N-1)$] to process a second data symbol sequence [$a(0)q(0)$, $a(1)q(1)$, ..., $a(M-1)q(M-1)$] and a third data symbol sequence [$d(0)q(0)$, $d(1)q(1)$, ..., $d(M-1)q(M-1)$] that are obtained according to a first data symbol sequence [$q(0)$, $q(1)$, ..., $q(M-1)$] to be transmitted in a timeslot and coefficients $a(i)$ and $d(i)$, and then mapped respectively onto the same time-frequency resources corresponding to a first antenna array and a second antenna array and transmitted.

In this embodiment, the transmitting terminal can implement the technical solutions in the method embodiment illustrated in FIG. 1, and the implementation principles are similar and not repeated herein any further.

Step 702: Obtain, according to the first data, the extension sequence [$w(0)$, $w(1)$, ..., $w(N-1)$], and the coefficients $a(i)$ and $d(i)$, a data symbol $q(i)$ to be transmitted by the transmitting terminal, where, in $a(i)+d(i)$, at least one pair of $a(u)+d(u)$ and $a(v)+d(v)$ have unequal moduli; i, u, and v are integers, $0 \le i \le M-1$, $0 \le u \le M-1$, $0 \le v \le M-1$, and $u \ne v$.

In this embodiment, the first data transmitted by a transmitting terminal is received, and the data symbols to be transmitted by the transmitting terminal are obtained according to the first data and the same extension sequence and coefficients as what are configured by the transmitting terminal. Therefore, the transmitting terminal can improve resource utilization effectively and accurately obtain the data symbols to be transmitted by the transmitting terminal.

Further, on the basis of the embodiment shown in FIG. 11, in another embodiment of the present invention, step 702 may specifically include:

estimating a first fading coefficient $h_1$ of a channel from the first antenna array to the receiving terminal according to a pilot transmitted by the first antenna array of the transmitting terminal, and estimating a second fading coefficient $h_2$ of a channel from the second antenna array to the receiving terminal according to a pilot transmitted by the second antenna array of the transmitting terminal;

de-extending the first data to obtain third data by using the same extension sequence [$w(0)$, $w(1)$, ..., $w(N-1)$] as what is configured by the transmitting terminal; and performing demodulation according to the third data, the first fading coefficient $h_1$, the second fading coefficient $h_2$, and coefficients $a(i)$ and $d(i)$ to obtain the data symbol $q(i)$ to be transmitted by the transmitting terminal.

For example, taking the embodiment illustrated in FIG. 5 as an example, the data on the subcarriers on the SC-FDMA symbols, which is obtained on a receiving antenna of the receiving terminal, may be expressed as:

$$y = h_1 * a(i)q(i) * w(m) + h_2 * d(i)q(i) * w(m) + N(m)$$
$$= [h_1 * a(i) + h_2 * d(i)] * q(i) * w(m) + N(m)$$

where $h_1$ is a channel fading coefficient from the first antenna array to the receiving antenna, $h_2$ is a fading coefficient from the second antenna array to the receiving antenna, and $N(m)$ is a noise interference term. Subsequently, all data corresponding to the data $q(i)*w(m)$ and existing on the receiving terminal may be collected, and be de-extended by using the extension sequence [$w(0)$, $w(1)$, ... $w(4)$].

In addition, the receiving terminal learns which subcarrier of which SC-FDMA symbol in the PRB, where the control channel is located, the data obtained by extending the same data symbol $q(i)$ on the transmitting terminal is placed on (or mapped onto). Therefore, the receiving terminal learns which data on the receiving terminal corresponds to the data $q(i)*w(m)$ obtained by de-extending the same data $q(i)$. The data on the receiving terminal corresponding to the data $q(i)*w(m)$ obtained by de-extending the same data $q(i)$ may be expressed as [$h_1*a(i)+h_2*d(i)]*q(i)*w(m)+N(m)$, where $m=0, 1, ..., 4$.

For example, an extension sequence [$w(0)$, $w(1)$, ... $w(4)$] is used to perform de-extension. For example, $w(m)$ is multiplied by corresponding received data [$h_1*a(i)+h_2*d(i)]*q(i)*w(m)+N(m)$, and then the products are summed to obtain:

$$\{[h_1 * a(i) + h_2 * d(i)] * q(i) * w(0) + N(0)\} * w(0) +$$
$$\{[h_1 * a(i) + h_2 * d(i)] * q(i) * w(1) + N(1)\} * w(1) + ...$$
$$\{[h_1 * a(i) + h_2 * d(i)] * q(i) * w(4) + N(4)\} *$$
$$w(4) = [h_1 * a(i) + h_2 * d(i)] * q(i) * [w(0)^2 + ... + w(4)^2] +$$
$$[w(0)N(0) + ... + w(4)N(4)].$$

Subsequently, the channel fading coefficient $h_1$ is estimated by using the pilot transmitted by the first antenna array, and the channel fading coefficient $h_2$ is estimated by using the pilot transmitted by the second antenna array.

Then, demodulation and decoding are performed by using an estimated channel from the first antenna array to each receiving antenna, an estimated channel from the second antenna array to each receiving antenna, de-extended data corresponding to each q(i) on each receiving terminal, and the coefficients a(i) and d(i) corresponding to each q(i) on each transmitting antenna array.

Specifically, the receiving terminal now learns $h_1$, $h_2$, a(i), d(i), and w(m), and only the data q(i) transmitted by the transmitting terminal and the noise interference term are unknown. Therefore, demodulation and decoding may be performed by using an existing conventional algorithm of the receiving terminal, for example, using a maximum likelihood algorithm. The data obtained by multiple receiving antennas is processed by using a maximal ratio combining (Maximal Ratio Combining, MRC for short) algorithm, or a minimal mean square error (Minimal Mean Square Estimation, MMSE) algorithm, or the like.

Figure 12:
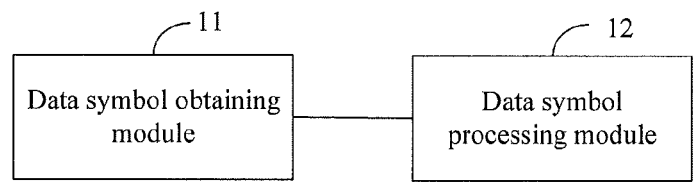
FIG. 12 is a schematic structural diagram of a transmitting terminal according to an embodiment of the present invention.

FIG. 12 is a schematic structural diagram of a transmitting terminal according to an embodiment of the present invention. As shown in FIG. 12, the apparatus in this embodiment includes a data symbol obtaining module 11 and a data symbol processing module 12. The data symbol obtaining module 11 is configured to obtain, according to a first data symbol sequence [q(0), q(1), . . . , q(M−1)] to be transmitted in a timeslot and coefficients a(i) and d(i), a second data symbol sequence [a(0)q(0), a(1)q(1), . . . , a(M−1)q(M−1)] and a third data symbol sequence [d(0)q(0), d(1)q(1), . . . , d(M−1)q(M−1)], where, in a(i)+d(i), at least one pair of a(u)+d(u) and a(v)+d(v) have unequal moduli. The data symbol processing module 12 is configured to use the same extension sequence to process the second data symbol sequence and the third data symbol sequence, map the processed data respectively onto the same time-frequency resources corresponding to a first antenna array and a second antenna array, and transmit the data, where i, u, and v are integers, $0 \le i \le M-1$, $0 \le u \le M-1$, $0 \le v \le M-1$, and $u \ne v$.

The transmitting terminal in this embodiment can implement the technical solutions in the method embodiment illustrated in FIG. 1, and the implementation principles are similar and not repeated herein any further.

In this embodiment, a second data symbol sequence and a third data symbol sequence are obtained according to a first data symbol sequence to be transmitted in a timeslot and coefficients a(i) and d(i), the same extension sequence is used to process the second data symbol sequence and the third data symbol sequence, and the processed data is respectively mapped onto the same time-frequency resources corresponding to a first antenna array and a second antenna array and is transmitted. In a(i)+d(i), at least one pair of a(u)+d(u) and a(v)+d(v) have unequal moduli, and each antenna array can use the same extension sequence. Therefore, the same PRB can bear more transmitting terminals, and resource utilization is improved effectively.

Figure 13:
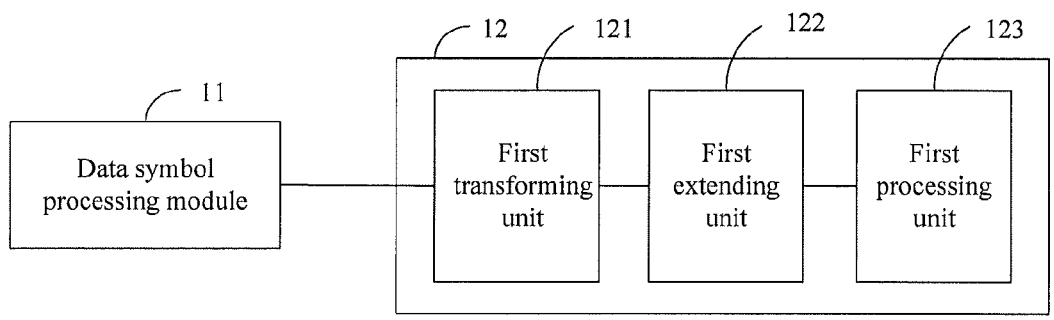
FIG. 13 is a schematic structural diagram of a transmitting terminal according to another embodiment of the present invention.

Further, FIG. 13 is a schematic structural diagram of a transmitting terminal according to another embodiment of the present invention. On the basis of the embodiment illustrated in FIG. 12, as shown in FIG. 13, the data symbol processing module 12 includes a first transforming unit 121, a first extending unit 122, and a first processing unit 123. The first transforming unit 121 is configured to perform DFT or FFT transformation for the second data symbol sequence and the third data symbol sequence to obtain a fourth data symbol sequence [$Q_1(0)$, $Q_1(1)$, . . . , $Q_1(M-1)$] and a fifth data symbol sequence [$Q_2(0)$, $Q_2(1)$, . . . , $Q_2(M-1)$], respectively. The first extending unit 122 is configured to use the same extension sequence [w(0), w(1), . . . , w(N−1)] to extend each data symbol $Q_1(i)$ in the fourth data symbol sequence and each data symbol $Q_2(i)$ in the fifth data symbol sequence. The first processing unit 123 is configured to map first N-block data [$Q_1(0)$w(m), $Q_1(1)$w(m), . . . , $Q_1(M-1)$w(m)] and second N-block data [$Q_2(0)$w(m), $Q_2(1)$w(m), . . . , $Q_2(M-1)$w(m)] obtained by extension respectively onto the same time-frequency resources corresponding to a first antenna array and a second antenna array, and transmit the data, where m, N, and M are integers, $0 \le m \le N-1$, $N \ge 1$, and $M \ge 1$.

The transmitting terminal in this embodiment can implement the technical solutions in the method embodiment illustrated in FIG. 2, and the implementation principles are similar and not repeated herein any further.

Further, the data symbols in the first data symbol sequence are formed by P data symbol sets, and the P data symbol sets are obtained by performing channel coding and modulation on P information bit sets, respectively. Then, the data symbol obtaining module 11 is further configured to cause at least one pair of $a_k(u)+d_k(u)$ and $a_k(v)+d_k(v)$ in $a_k(i)+d_k(i)$ to have unequal moduli, where $a_k(i)$ and $d_k(i)$ are coefficients corresponding to a $k^{th}$ data symbol set in the P data symbol sets, and $a_k(i)$ and $d_k(i)$ belong to a(i) and d(i), respectively, where P and k are integers.

Figure 14:
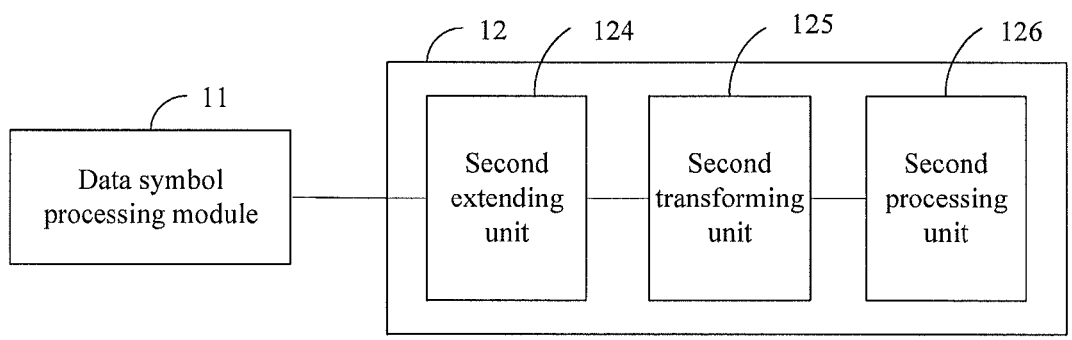
FIG. 14 is a schematic structural diagram of a transmitting terminal according to another embodiment of the present invention.

Further, FIG. 14 is a schematic structural diagram of a transmitting terminal according to another embodiment of the present invention. On the basis of the embodiment illustrated in FIG. 12, as shown in FIG. 14, the data symbol processing module 12 may further include a second extending unit 124, a second transforming unit 125, and a second processing unit 126. The second extending unit 124 is configured to use the same extension sequence [w(0), w(1), . . . , w(N−1)] to extend each data symbol a(i)q(i) in the second data symbol sequence and each data symbol d(i)q(i) in the third data symbol sequence to obtain third N-block data [a(0)q(0)w(m), a(1)q(1)w(m), . . . , a(M−1)q(M−1)w(m)] and fourth N-block data [d(0)q(0)w(m), d(1)q(1)w(m), . . . , d(M−1)q(M−1)w(m)]. The second transforming unit 125 is configured to perform DFT or FFT transformation on each block of data in the third N-block data and each block of data in the fourth N-block data to obtain fifth N-block data [$Q_1(0)$w(m), $Q_1(1)$w(m), . . . , $Q_1(M-1)$w(m)] and sixth N-block data [$Q_2(0)$w(m), $Q_2(1)$w(m), . . . , $Q_2(M-1)$w(m)], respectively. The second processing unit 126 is configured to map the fifth N-block data and the sixth N-block data respectively onto the same time-frequency resources corresponding to a first antenna array and a second antenna array, and transmit the data, where m, N, and M are integers, $0 \le m \le N-1$, $N \ge 1$, and $M \ge 1$.

The transmitting terminal in this embodiment can implement the technical solutions in the method embodiment illustrated in FIG. 4, and the implementation principles are similar and not repeated herein any further.

Figure 15:
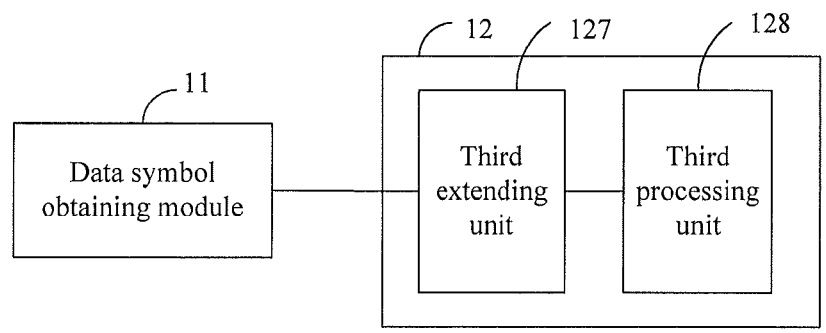
FIG. 15 is a schematic structural diagram of a transmitting terminal according to another embodiment of the present invention.

Further, FIG. 15 is a schematic structural diagram of a transmitting terminal according to another embodiment of the present invention. On the basis of the embodiment illustrated in FIG. 12, as shown in FIG. 15, the data symbol processing module 12 may further include a third extending unit 127 and a third processing unit 128. The third extending unit 127 is configured to use the same extension sequence [w(0), w(1), . . . , w(N−1)] to extend each data symbol a(i)q(i) in the second data symbol sequence and each data symbol d(i)q(i) in the third data symbol sequence to obtain seventh N-block data [a(0)q(0)w(m), a(1)q(1)w(m), . . . , a(M−1)q(M−1)w(m)] and eighth N-block data [d(0)q(0)w(m), d(1)q(1)w(m), . . . , d(M−1)q(M−1)w(m)], respectively. The third processing unit 128 is configured to map the seventh N-block data and the eighth N-block data respectively onto the same time-frequency resources corresponding to the first antenna array and the second antenna array, and transmit the data, where m, N, and M are integers, $0 \leq m \leq N-1$, $N \geq 1$, and $M \geq 1$.

The transmitting terminal in this embodiment can implement the technical solutions in the method embodiment illustrated in FIG. 5, and the implementation principles are similar and not repeated herein any further.

Figure 16:
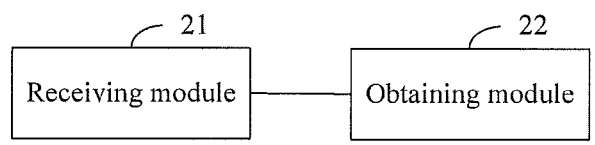
FIG. 16 is a schematic structural diagram of a receiving terminal according to an embodiment of the present invention.

FIG. 16 is a schematic structural diagram of a receiving terminal according to an embodiment of the present invention. As shown in FIG. 16, the receiving terminal in this embodiment includes a receiving module 21 and an obtaining module 22. The receiving module 21 is configured to receive first data transmitted by a transmitting terminal, where the first data is obtained after the transmitting terminal uses the same extension sequence [w(0), w(1), ..., w(N−1)] to process a second data symbol sequence [a(0)q(0), a(1)q(1), ..., a(M−1)q(M−1)] and a third data symbol sequence [d(0)q(0), d(1)q(1), ..., d(M−1)q(M−1)] that are obtained according to a first data symbol sequence [q(0), q(1), ..., q(M−1)] to be transmitted in a timeslot and coefficients a(i) and d(i), and then mapped respectively onto the same time-frequency resources corresponding to a first antenna array and a second antenna array and transmitted. The data symbol obtaining module 22 is configured to obtain, according to first data, an extension sequence [w(0), w(1), ..., w(N−1)], and coefficients a(i) and d(i), a data symbol q(i) to be transmitted by the transmitting terminal, where, in a(i)+d(i), at least one pair of a(u)+d(u) and a(v)+d(v) have unequal moduli; i, u, and v are integers, $0 \leq i \leq M-1$, $0 \leq u \leq M-1$, $0 \leq v \leq M-1$, and $u \neq v$.

The receiving terminal in this embodiment can implement the technical solutions in the method embodiment illustrated in FIG. 11, and the implementation principles are similar and not repeated herein any further.

In this embodiment, the first data transmitted by a transmitting terminal is received, and the data symbols to be transmitted by the transmitting terminal are obtained according to the first data and the same extension sequence and coefficients as what are configured by the transmitting terminal. Therefore, the transmitting terminal can improve resource utilization effectively and accurately obtain the data symbols to be transmitted by the transmitting terminal.

Figure 17:
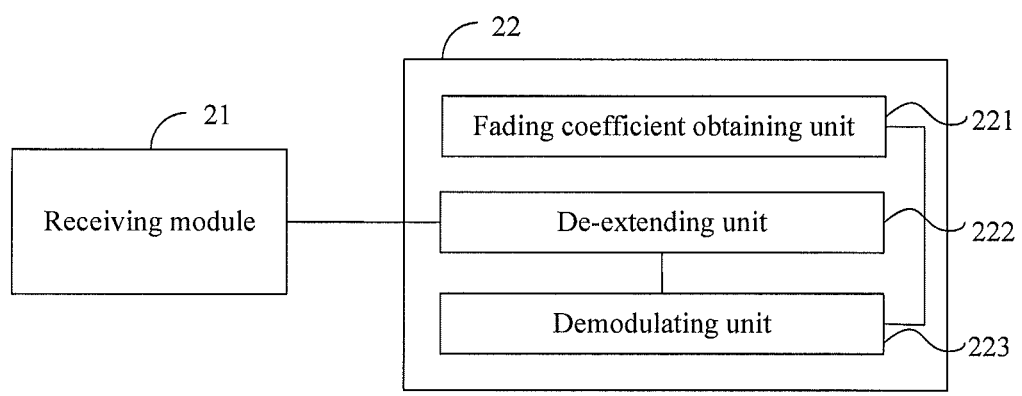
FIG. 17 is a schematic structural diagram of a receiving terminal according to another embodiment of the present invention.

Further, FIG. 17 is a schematic structural diagram of a receiving terminal according to another embodiment of the present invention. On the basis of the embodiment shown in FIG. 16, as shown in FIG. 17, the obtaining module 22 includes a fading coefficient obtaining unit 221, a de-extending unit 222, and a demodulating unit 223. The fading coefficient obtaining unit 221 is configured to estimate a first fading coefficient $h_1$ of a channel from the first antenna array to the receiving terminal according to a pilot transmitted by the first antenna array of the transmitting terminal, and estimate a second fading coefficient $h_2$ of a channel from the second antenna array to the receiving terminal according to a pilot transmitted by the second antenna array of the transmitting terminal. The de-extending unit 222 is configured to de-extend the first data to obtain third data by using the same extension sequence [w(0), w(1), ..., w(N−1)] as what is configured by the transmitting terminal. The demodulating unit 223 is configured to perform demodulation according to the third data, the first fading coefficient $h_1$ the second fading coefficient $h_2$, and coefficients a(i) and d(i), to obtain the data symbol q(i) to be transmitted by the transmitting terminal.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various mediums capable of storing program codes, such as a ROM, a RAM, a magnetic disk or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that modifications may still be made to the technical solutions described in the foregoing embodiments, or equivalent replacements may still be made to some technical features thereof, without departing from the spirit and scope of the technical solutions of the embodiments of the present invention.

What is claimed is:

1. A communication method for a control channel, wherein the control channel comprises at least one timeslot, and the method comprises:

obtaining by a transmitting terminal, according to a first data symbol sequence [q(0), q(1), ..., q(M−1)] to be transmitted in a timeslot and coefficients a(i) and d(i), a second data symbol sequence [a(0), q(0)a(1) q(1), ..., a(M−1)q(M−1)] and a third data symbol sequence [d(0)q(0), d(1)q(1), ..., d(M−1)q(M−1)], wherein, in a(i)+d(i), at least one pair of a(u)+d(u) and a(v)+d(v) have unequal moduli and are thus substantially orthogonal to each other; and using the same extension sequence [w(0), w(1), ..., w(N−1)] to process the second data symbol sequence and the third data symbol sequence as processed data, mapping by the transmitting terminal based on the unequal moduli the processed data respectively onto the same time-frequency resources corresponding to a first antenna array and a second antenna array, and transmitting the mapped data by the first antenna array and the second antenna array over the control channel, wherein, i, u, and v are integers, $0 \leq i \leq M-1$, $0 \leq u \leq M-1$, $0 \leq v \leq M-1$.

2. The communication method for a control channel according to claim 1, wherein: the using the same extension sequence [w(0), w(1), ..., w(N−1)] to process the second data symbol sequence and the third data symbol sequence, mapping the processed data respectively onto the same time-frequency resources corresponding to a first antenna array and a second antenna array, and transmitting the data, comprise:

performing discrete Fourier transformation or fast Fourier transformation on the second data symbol sequence and the third data symbol sequence to obtain a fourth data symbol sequence [$Q_1(0)$, $Q_1(1)$, ..., $Q_{1(M-}1)$] and a fifth data symbol sequence [$Q_2(0)$, $Q_2(1)$, ..., $Q_2(M-1)$], respectively;

using the same extension sequence to extend each data symbol $Q_1(i)$ in the fourth data symbol sequence and each data symbol $Q_2(i)$ in the fifth data symbol sequence; and mapping first N-block data [$Q_1(0)w(m)$, $Q_1(1)w(m)$, ..., $Q_1(M-1)w(m)$] and second N-block data [$Q_2(0)w(m)$, $Q_2(1)w(m)$, ..., $Q_2(M-1)w(m)$] obtained by extension respectively onto the same time-frequency resources corresponding to the first antenna array and the second antenna array, and transmitting the data, wherein, m, N, and M are integers, 0≤m≤N−1, N≥1, and M≥1.

3. The communication method for a control channel according to claim 1, wherein: the using the same extension sequence [w(0), w(1), . . . , w(N−1)] to process the second data symbol sequence and the third data symbol sequence, mapping the processed data respectively onto the same time-frequency resources corresponding to a first antenna array and a second antenna array, and transmitting the data, comprise:

using the same extension sequence to extend each data symbol a(i)q(i) in the second data symbol sequence and each data symbol d(i)q(i) in the third data symbol sequence to obtain third N-block data [a(0)q(0)w(m), a(1)q(1)w(m), . . . , a(M−1)q(M−1)w(m)] and fourth N-block data [d(0)q(0)w(m), d(1)q(1)w(m),. . . , d(M−1)q(M−1)w(m)];

performing discrete Fourier transformation or fast Fourier transformation on each block of data in the third N-block data and each block of data in the fourth N-block data to obtain fifth N-block data [$Q_1$(0)w(m), $Q_1$(1)w(m), . . . , $Q_1$(M−1)w(m)] and sixth N-block data [$Q_2$(0)w(m), $Q_2$(1)w(m), . . . , $Q_2$(M−1)w(m)], respectively; and mapping the fifth N-block data and the sixth N-block data respectively onto the same time-frequency resources corresponding to the first antenna array and the second antenna array, and transmitting the data, wherein, m, N, and M are integers, 0≤m≤N−1, N≥1 and M≥1.

4. The communication method for a control channel according to claim 1, wherein: the using the same extension sequence [w(0), w(1), . . . , w(N−1)] to process the second data symbol sequence and the third data symbol sequence, mapping the processed data respectively onto the same time-frequency resources corresponding to a first antenna array and a second antenna array, and transmitting the data, comprise:

using the same extension sequence to extend each data symbol a(i)q(i) in the second data symbol sequence and each data symbol d(i)q(i) in the third data symbol sequence to obtain seventh N-block data [a(0)q(0)w(m), a(1)q(1)w(m), . . . , a(M−1)q(M−1)w(m)] and eighth N-block data [d(0)q(0)w(m), d(1)q(1)w(m), . . . , d (M−1)q(M−1)w(m)], respectively; and mapping the seventh N-block data and the eighth N-block data respectively onto the same time-frequency resources corresponding to the first antenna array and the second antenna array, and transmitting the data, wherein, m, N, and M are integers, 0≤m≤N−1, N≥1, and M≥1.

5. The communication method for a control channel according to claim 1, wherein: the coefficient a(i)=1, and the coefficient $$d(i) = \begin{cases} 1 & i = 2n \\ -1 & i = 2n+1; \end{cases}$$

or the coefficient a(i)=1, and the coefficient $$d(i) = \exp\left(\frac{j2\pi * \gamma_1 * i}{M}\right);$$

or the coefficient a(i)=1, and the coefficient $$d(i) = \begin{cases} 1 & i = 4n \\ -1 & i = 4n+1 \\ j & i = 4n+2 \\ -j & i = 4n+3; \end{cases}$$

or the coefficient $$a(i) = \exp\left(\frac{j2\pi * \gamma_1 * i}{M}\right),$$

and the coefficient $$d(i) = \exp\left(\frac{j2\pi * \gamma_2 * i}{M}\right),$$

wherein, n, $\gamma_1$, and $\gamma_2$ are integers, 0≤2n≤M−1, 0≤2n+1≤M−1, 0≤4n≤M−1, 0≤4n+1≤M−1, 0≤4n+2≤M−1 0≤4n+3≤M−1, and $\gamma_1 \neq \gamma_2$.

6. The communication method for a control channel according to claim 1, wherein: the data symbols in the first data symbol sequence are formed by P data symbol sets, and the P data symbol sets are obtained by performing channel coding and modulation performed on P information bit sets, respectively; and in a(i)+d(i), at least one pair of a(u)+d(u) and a(v)+d(v) have moduli unequal to each other, as detailed below:

in $a_k$(i)+$d_k$(i), at least one pair of $a_k$(u)+$d_k$(u) and $a_k$(v)+$d_k$(v) have moduli unequal to each other, wherein $a_k$(i) and $d_k$(i) are coefficients corresponding to a $k^{th}$ data symbol set in the P data symbol sets, and $a_k$(i) and $d_k$(i) belong to a(i) and d(i), respectively, wherein, P and k are integers.

7. A transmitting terminal, comprising:

a non-transitory computer readable storage medium to store program(s), and computer hardware configured to, including configured by the program(s), to:

obtain, according to a first data symbol sequence [q(0), q(1), . . . , q(M−1)] to be transmitted in a timeslot and coefficients a(i) and d(i), and a second data symbol sequence [a(0)q(0), a(1)q(1), . . . , a(M−1)q(M−1)] and a third data symbol sequence [d(0)q(0), d(1)q(1), . . . , d(M−1)q(M−1)] wherein, in a(i)+d(i), at least one pair of a(u)+d(u) and a(v)+d(v) have unequal moduli and are thus substantially orthogonal to each other; and use the same extension sequence [w(0), w(1), . . . , w(N−1)] to process the second data symbol sequence and the third data symbol sequence as processed data, map based on the unequal moduli the processed data respectively onto the same time-frequency resources corresponding to a first antenna array and a second antenna array, and transmit the mapped data by the first antenna array and the second antenna array over the control channel, wherein, i, u, and v are integers, $0 \leq i \leq M-1$, $0 \leq u \leq M-1$, $0 \leq v \leq M-1$, and $u \neq v$.

8. The transmitting terminal according to claim 7, wherein the computer hardware further configured to:

perform discrete Fourier transformation or fast Fourier transformation on the second data symbol sequence and the third data symbol sequence to obtain a fourth data symbol sequence $[Q_1(0), Q_1(1), \ldots, Q_1(M-1)]$ and a fifth data symbol sequence $[Q_2(0), Q_2(1), \ldots, Q_2(M-1)]$, respectively;

use the same extension sequence to extend each data symbol $Q_1(i)$ in the fourth data symbol sequence and each data symbol $Q_2(i)$ in the fifth data symbol sequence; and map first N-block data $[Q_1(0)w(m), Q_1(1)w(m), \ldots, Q_1(M-1)w(m)]$ and second N-block data $[Q_2(0)w(m), Q_2(1)w(m), \ldots, Q_1(M-1)w(m)]$ obtained by extension respectively onto the same time-frequency resources corresponding to the first antenna array and the second antenna array, and transmit the data, wherein, m, N, and M are integers, $0 \leq m \leq N-1$, $N \geq 1$, and $M \geq 1$.

9. The transmitting terminal according to claim 7, wherein the computer hardware further configured to:

use the same extension sequence to extend each data symbol $a(i)q(i)$ in the second data symbol sequence and each data symbol $d(i)q(i)$ in the third data symbol sequence to obtain third N-block data $[a(0)q(0)w(m), a(1)q(1)w(m), \ldots, a(M-1)q(M-1)w(m)]$ and fourth N-block data $[d(0)q(0)w(m), d(1)q(1)w(m), \ldots, d(M-1)q(M-1)w(m)]$, respectively;

perform discrete Fourier transformation or fast Fourier transformation on each block of data in the third N-block data and each block of data in the fourth N-block data to obtain fifth N-block data $[Q_1(0)w(m), Q_1(1)w(m), \ldots, Q_1(M-1)w(m)]$ and sixth N-block data $[Q_2(0)w(m), Q_2(1)w(m), \ldots, Q_2(M-1)w(m)]$, respectively; and map the fifth N-block data and the sixth N-block data respectively onto the same time-frequency resources corresponding to the first antenna array and the second antenna array, and transmit the data, wherein, m, N, and M are integers, $0 \leq m \leq N-1$, $N \geq 1$, and $M \geq 1$.

10. The transmitting terminal according to claim 7, wherein the computer hardware further configured to:

use the same extension sequence to extend each data symbol $a(i)q(i)$ in the second data symbol sequence and each data symbol $d(i)q(i)$ in the third data symbol sequence to obtain seventh N-block data $[a(0)Q(0)w(m), a(1)Q(1)w(m), \ldots, a(M-1)Q(M-1)w(m)]$ and eighth N-block data $[d(0)Q(0)w(m), d(1)Q(1)w(m), \ldots, d(M-1)Q(M-1)w(m)]$, respectively; and map the seventh N-block data and the eighth N-block data respectively onto the same time-frequency resources corresponding to the first antenna array and the second antenna array, and transmit the data, wherein, m, N, and M are integers, $0 \leq m \leq N-1$, $N \geq 1$, and $M \geq 1$.

11. The transmitting terminal according to claim 7, wherein: data symbols in the first data symbol sequence are formed by P data symbol sets, and the P data symbol sets are obtained by performing channel coding and modulation on P information bit sets, respectively, and then, the data symbol obtaining module is further configured to cause at least one pair of $a_k(u)+d_k(u)$ and $a_k(v)+d_k(v)$ in $a_k(i)+d_k(i)$ to have moduli unequal to each other, wherein $a_k(i)$ and $d_k(i)$ are coefficients corresponding to a $k^{th}$ data symbol set in the P data symbol sets, and $a_k(i)$ and $d_k(i)$ belong to the $a(i)$ and the $d(i)$, respectively, wherein, P and k are integers.

12. A communication method for a control channel, wherein the control channel comprises at least one timeslot, and the method comprises:

receiving, by a receiving terminal, first data transmitted by a transmitting terminal, where the first data is obtained after the transmitting terminal uses the same extension sequence $[w(0), w(1), \ldots, w(N-1)]$ to process a second data symbol sequence $[a(0)q(0), a(1)q(1), \ldots, a(M-1)q(M-1)]$ and a third data symbol sequence $[d(0)q(0), d(1)q(1), \ldots, d(M-1)q(M-1)]$ that are obtained according to a first data symbol sequence $[q(0), q(1), \ldots, q(M-1)]$ to be transmitted in a timeslot and coefficients $a(i)$ and $d(i)$, and then mapped respectively onto the same time-frequency resources corresponding to a first antenna array and a second antenna array and transmitted by the first antenna array and the second antenna array over the control channel; and obtaining, by the receiving terminal and according to the first data, the extension sequence $[w(0), w(1), \ldots, w(N-1)]$, and the coefficients $a(i)$ and $d(i)$, a data symbol $q(i)$ to be transmitted by the transmitting terminal, wherein, in $a(i)+d(i)$, at least one pair of $a(u)+d(u)$ and $a(v)+d(v)$ have unequal moduli and are thus substantially orthogonal to each other and are mapped based on the unequal moduli; and i, u, and v are integers, $0 \leq i \leq M-1$, $0 \leq u \leq M-1$, $0 \leq v \leq M-1$ and $u \neq v$.

13. The communication method for a control channel according to claim 12, wherein: the obtaining, according to the first data, the extension sequence $[w(0), w(1), \ldots, w(N-1)]$, and the coefficients $a(i)$ and $d(i)$, the data symbol $q(i)$ to be transmitted by the transmitting terminal comprises:

estimating, according to a pilot transmitted by the first antenna array of the transmitting terminal, a first fading coefficient $h_1$ of a channel from the first antenna array to a receiving terminal, and estimating, according to a pilot transmitted by the second antenna array of the transmitting terminal, a second fading coefficient $h_2$ of a channel from the second antenna array to the receiving terminal;

de-extending the first data to obtain third data by using the same extension sequence $[w(0), w(1), \ldots, w(N-1)]$ as what is configured by the transmitting terminal; and performing demodulation according to the third data, the first fading coefficient $h_1$, the second fading coefficient $h_2$, and the coefficients $a(i)$ and $d(i)$ to obtain a data symbol $q(i)$ to be transmitted by the transmitting terminal.

14. A receiving terminal, comprising:

a non-transitory computer readable storage medium to store program(s), and computer hardware configured to, including configured by the program(s), to:

receive first data transmitted by a transmitting terminal, where the first data is obtained after the transmitting terminal uses the same extension sequence $[w(0), w(1), \ldots, w(N-1)]$ to process a second data symbol sequence $[a(0)q(0), a(1)q(1), \ldots, a(M-1)q(M-1)]$ and a third data symbol sequence $[d(0)q(0), d(1)q(1), \ldots, d(M-1)q(M-1)]$ that are obtained according to a first data symbol sequence $[q(0), q(1), \ldots, q(M-1)]$ to be transmitted in a timeslot and coefficients $a(i)$ and $d(i)$, and then mapped respectively onto the same time-frequency resources corresponding to a first antenna array and a second antenna array and transmitted and transmitted by the first antenna array and the second antenna array over a control channel; and obtain, according to the first data, the extension sequence [w(0), w(1), . . . , w(N−1)], and the coefficients a(i) and d(i), a data symbol q(i) to be transmitted by the transmitting terminal, wherein, in a(i)+d(i), at least one pair of a(u)+d(u) and a(v)+d(v) have unequal moduli and are thus substantially orthogonal to each other and are mapped based on the unequal moduli; and i, u, and v are integers, $0 \leq i \leq M-1$, $0 \leq u \leq M-1$, $0 \leq v \leq M-1$, and $u \neq v$.

15. The receiving terminal according to claim 14, wherein the computer hardware further configured to:

estimate, according to a pilot transmitted by the first antenna array of the transmitting terminal, a first fading coefficient $h_1$ of a channel from the first antenna array to the receiving terminal, and estimate, according to a pilot transmitted by the second antenna array of the transmitting terminal, a second fading coefficient $h_2$ of a channel from the second antenna array to the receiving terminal;

de-extend the first data to obtain third data by using the same extension sequence [w(0), w(1), . . . , w(N−1)] as what is configured by the transmitting terminal; and to perform demodulation according to the third data, the first fading coefficient $h_1$, the second fading coefficient $h_2$, and coefficients a(i) and d(i) to obtain the data symbol q(i) to be transmitted by the transmitting terminal.

* * * * *